United States Patent
Al-Kattan

(10) Patent No.: US 10,677,294 B2
(45) Date of Patent: Jun. 9, 2020

(54) DECOUPLER ASSEMBLY

(71) Applicant: Volvo Car Corporation, Gothenburg (SE)

(72) Inventor: Hayder Al-Kattan, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 140 days.

(21) Appl. No.: 15/684,140

(22) Filed: Aug. 23, 2017

(65) Prior Publication Data

US 2018/0087584 A1 Mar. 29, 2018

(30) Foreign Application Priority Data

Sep. 23, 2016 (EP) ..................................... 16178415

(51) Int. Cl.

| | |
|---|---|
| *F16D 41/07* | (2006.01) |
| *F16F 15/123* | (2006.01) |
| *F16F 15/121* | (2006.01) |
| *F16D 3/66* | (2006.01) |
| *F16D 47/02* | (2006.01) |
| *F16D 3/76* | (2006.01) |
| *F16H 55/36* | (2006.01) |

(Continued)

(52) U.S. Cl.
CPC .............. *F16D 41/07* (2013.01); *F16D 3/66* (2013.01); *F16D 3/76* (2013.01); *F16D 47/02* (2013.01); *F16F 15/1213* (2013.01); *F16F 15/1232* (2013.01); *F16D 41/20* (2013.01); *F16D 2041/0605* (2013.01); *F16H 55/36* (2013.01)

(58) Field of Classification Search
None
See application file for complete search history.

(56) References Cited

U.S. PATENT DOCUMENTS

| 2,268,376 A | 12/1941 | Dodge |
|---|---|---|
| 2,307,881 A | 1/1943 | Dodge |

(Continued)

FOREIGN PATENT DOCUMENTS

| DE | 202014102314 U1 | 8/2015 |
|---|---|---|
| EP | 2269904 A1 | 1/2011 |

(Continued)

*Primary Examiner* — Mark A Manley
(74) *Attorney, Agent, or Firm* — Snyder, Clark, Lesch & Chung, LLP

(57) ABSTRACT

A decoupler assembly comprises a torque equalizer and a one-way clutch bearing. The torque equalizer comprises an inner member having a rotational axis, an outer member disposed concentrically and surrounding the inner member, and two arcuate spring elements arranged between the inner member and the outer member, and configured to transmit torque between the inner and outer members. The inner member is rotationally displaceable relative to the outer member at least 30 degrees upon compression of the two arcuate spring elements. The one-way clutch bearing is located in the same radial plane as torque equalizer and rotationally connected to the inner member or the outer member. The one-way clutch bearing comprises an outer race, an inner race, and a plurality of individual wedging locking elements that are disposed between the inner and outer races. The decoupler assembly may comprise a single spiral spring element or a rubber-based spring element.

7 Claims, 12 Drawing Sheets

(51) Int. Cl.
  *F16D 41/06* (2006.01)
  *F16D 41/20* (2006.01)

(56) References Cited

U.S. PATENT DOCUMENTS

| | | | |
|---|---|---|---|
| 2,631,706 A | | 3/1953 | Dodge |
| 3,776,335 A | | 12/1973 | Cadet |
| 5,230,409 A | * | 7/1993 | Tanaka .............. F16F 15/12353 |
| | | | 192/208 |
| 5,586,434 A | | 12/1996 | Okubo et al. |
| 6,547,227 B1 | * | 4/2003 | Mende ...................... F16F 1/04 |
| | | | 267/168 |
| 2006/0118379 A1 | | 6/2006 | Miura |
| 2007/0066426 A1 | | 3/2007 | Kandem et al. |
| 2009/0277739 A1 | | 11/2009 | Takasu |
| 2011/0315502 A1 | * | 12/2011 | Antchak ................ F16D 7/022 |
| | | | 192/75 |
| 2012/0190462 A1 | * | 7/2012 | Wahl ................ F16F 15/12326 |
| | | | 464/68.1 |
| 2015/0192190 A1 | * | 7/2015 | Lorenz .............. F16F 15/13157 |
| | | | 464/7 |

FOREIGN PATENT DOCUMENTS

| | | |
|---|---|---|
| EP | 2690311 A1 | 1/2014 |
| WO | 2008124873 A1 | 10/2008 |
| WO | 2009031569 A1 | 3/2009 |
| WO | 2015070329 A1 | 5/2015 |

\* cited by examiner

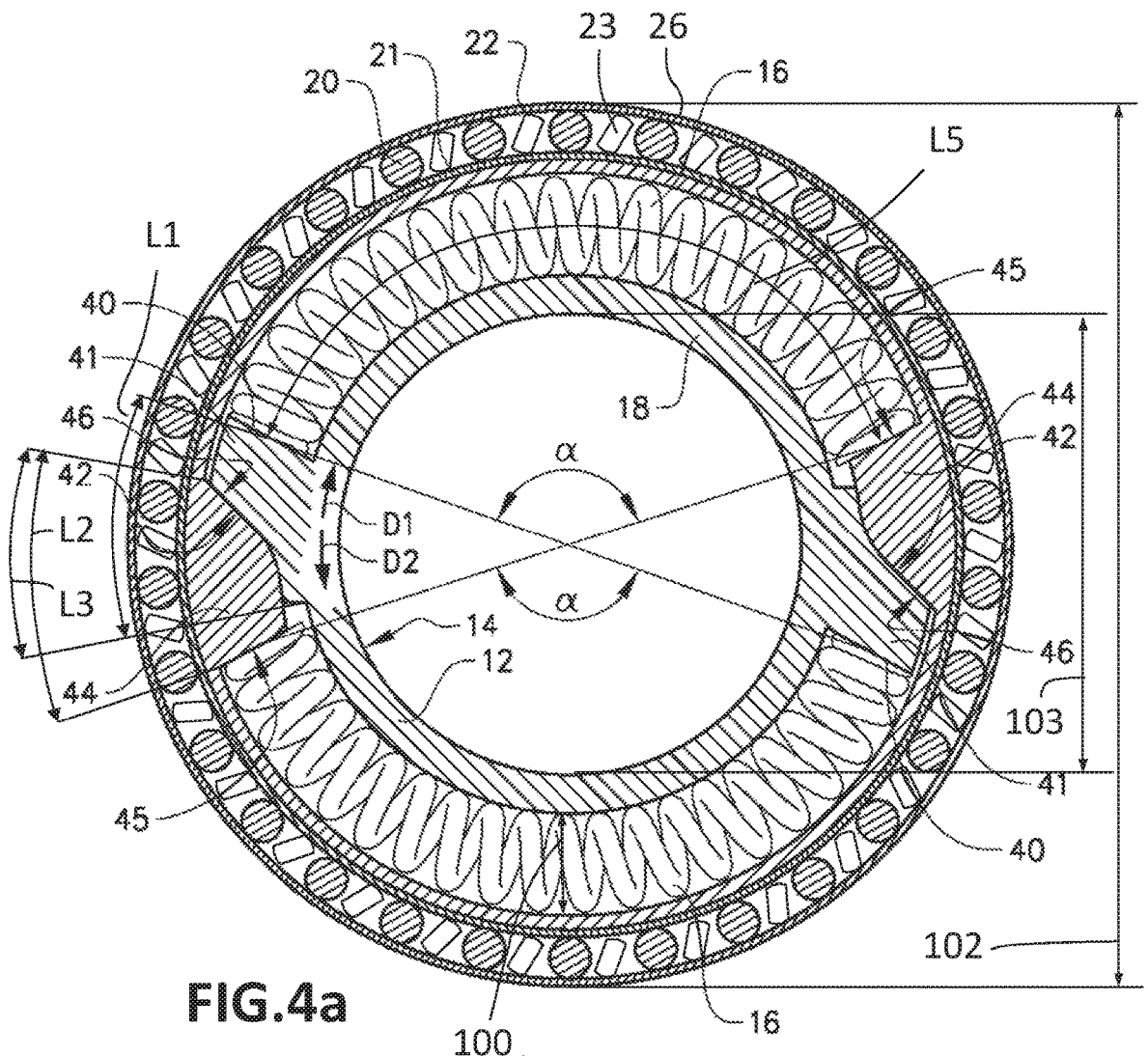
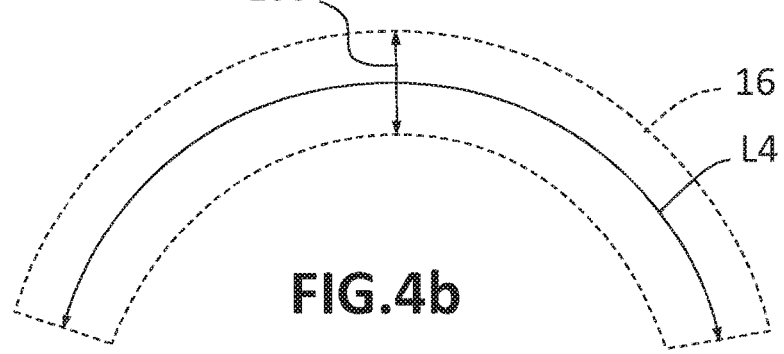

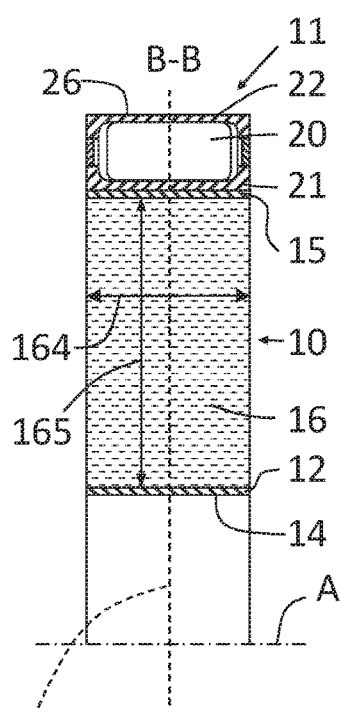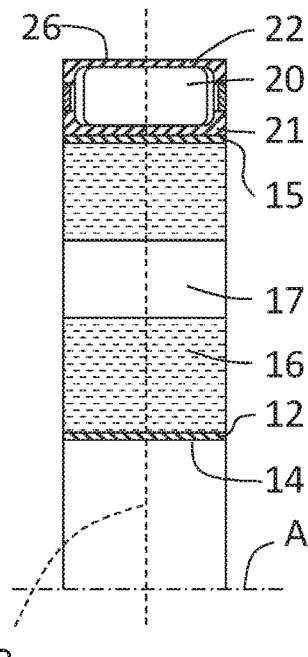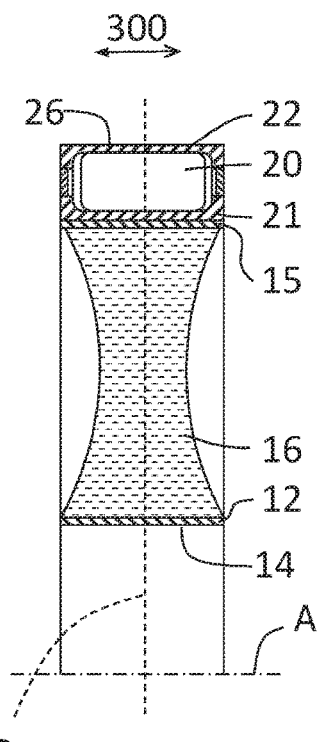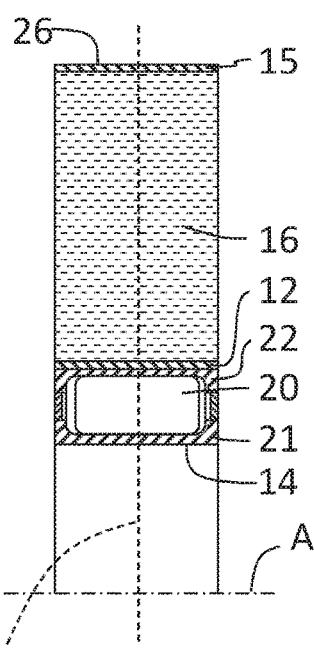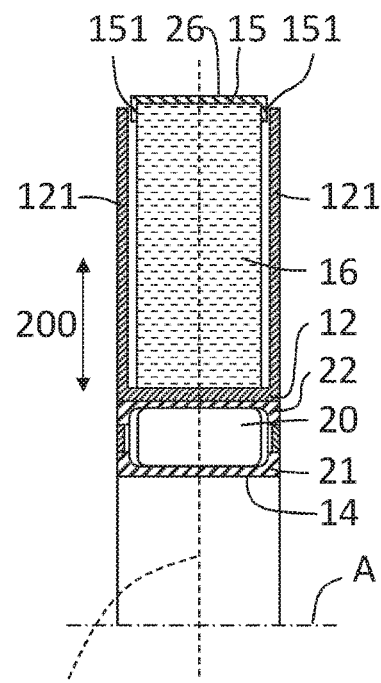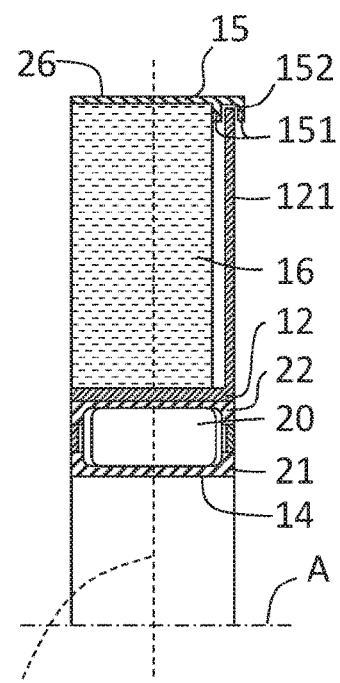

DECOUPLER ASSEMBLY

RELATED APPLICATION

This application claims priority under 35 U.S.C. § 119 based on European Patent Application No. 16178415.2, filed Sep. 23, 2016, the disclosure of which is hereby incorporated by reference herein.

TECHNICAL FIELD

This disclosure relates to a decoupler assembly comprising a torque equalizer, the torque equalizer comprises an inner member having a rotational axis, an outer member disposed concentrically about the inner member, and one or two spring elements arranged to transmit torque between the inner member and outer member. Such a decoupler assembly may advantageously be applied as decoupler between the crankshaft of a combustion engine and an auxiliary load, such as an alternator, an air conditioning compressor, a water or oil pump, or the like.

BACKGROUND

It is known from for example document US Patent Application Publication No. 2011/0315502 A1 to provide a decoupler on the crankshaft of a combustion engine for the purpose of attenuating speed fluctuations associated with accelerating/decelerating of auxiliary loads. While this decoupler may be satisfactory for its intended use, it is nonetheless susceptible to improvement. The object of the disclosure is to provide a decoupler having improved reliability and/or safety.

SUMMARY

The object is at least partly achieved by the decoupler assembly according to any of claim 1 or claim 8 or claim 11.

The decoupler assembly comprises a torque equalizer and a one-way clutch bearing. The torque equalizer comprises an inner member having a rotational axis, an outer member disposed concentrically and surrounding the inner member.

According to a first alternative design, the torque equalizer comprises two arcuate spring elements arranged between the inner member and outer member and configured to transmit torque between the inner member and outer member. The inner member can be rotationally displaced relative to the outer member at least 30 degrees, specifically at least 45 degrees, and more specifically at least 60 degrees upon compression of the two arcuate spring elements. The one-way clutch bearing is located in the same radial plane as torque equalizer and rotationally connected to the inner or outer member, and the one-way clutch bearing comprises an outer race, an inner race, and a plurality of individual wedging locking elements that are disposed between the inner and outer race.

According to a second alternative design, the torque equalizer comprises a single spiral spring element arranged between the inner member and outer member and configured to transmit torque between the inner member and outer member. The inner member can be rotationally displaced relative to the outer member at least 30 degrees, specifically at least 45 degrees, and more specifically at least 60 degrees upon tensioning of the spiral spring element. The one-way clutch bearing is located in the same radial plane as torque equalizer and rotationally connected to the inner or outer member, and the one-way clutch bearing comprises an outer race, an inner race, and a plurality of individual wedging locking elements that are disposed between the inner and outer race.

According to a third alternative design, the torque equalizer comprises a rubber-based spring element arranged between the inner member and outer member and configured to transmit torque between the inner member and outer member, wherein a first side of the rubber-based spring element is rotationally fastened to the inner member and a second side of the rubber-based spring element is rotationally fastened to the outer member, wherein the inner member is rotationally displaceable relative to the outer member at least 20 degrees, specifically at least 30 degrees, and more specifically at least 40 degrees solely based upon elastic deformation of the rubbed-based spring element. The one-way clutch bearing is located in the same radial plane as torque equalizer and rotationally connected to the inner or outer member, and the one-way clutch bearing comprises an outer race, an inner race, and a plurality of individual wedging locking elements that are disposed between the inner and outer race.

All three alternative designs disclosed above represent alternative solutions to the objective technical problem.

The use of a one-way clutch bearing having plurality of individual wedging locking elements that are disposed between the inner and outer race results in many advantages over use of a wrap spring as shown in the prior art. The traditional wrap spring has a plurality of helical coils that are lubricated with a desired lubricant, such as oil or grease. The wrap spring is arranged to radially expand or retract depending on transmitted rotary power and thereby adapted to selectively engage with the inner clutch surface of a drive member. A sliding contact of the wrap spring with the inner clutch surface of the drive member tend to generate heat, which in combination with a lubricant results in a certain risk that the lubricant catches fire. The sliding contact of the wrap spring also generates a certain level of wear, such that the long term reliability is low unless the spring and/or sliding surface is sufficiently frequently replaced. The wrap spring itself is further formed of relatively thin spring steel wire, which under certain operating conditions may be susceptible to break, thereby likely preventing transmission of propulsion torque from the engine to the auxiliary loads. This is particularly relevant when the decoupler assembly is located on the output shaft a diesel combustion engine for an automobile due to the significant torque levels that such an engine may generate.

Furthermore, the use of two arcuate spring elements or a single spiral spring element or a rubber-based spring element rotationally fastened to the inner and outer member provides a low cost, robust and reliable design. The spring elements can be adapted to the specific desired load of the clutch bearing and generally have a relatively high load capacity.

The large operating range of the torque equalizer of at least 20 degrees enables damping and smoothening of high torque pulsations from the power source without reaching the end positions of the torque equalizer, thereby reducing the risk for disturbing noise and vibration.

Also, since the one-way clutch bearing is located in the same radial plane as torque equalizer a decoupler with a relatively small axial length is provided. This enables a more compact packaging of the power source and possibly more space for pedestrian safety measures.

One-way clutch bearings having plurality of individual wedging locking elements disposed between the inner and outer race may have various designs. The wedging effect that causes the one-way clutch to enable relative rotation in one direction but not the opposite direction is typically realised by either have non-symmetrical wedging elements that cooperate with cylindrical races, or symmetrical wedging elements that cooperate with non-cylindrical races One example category of one-way clutch bearings comprises rolling elements that roll on continuous cylindrical surfaces of the inner and outer races for enabling reduced friction and heat generation. The individual wedging locking elements may then for example be disposed between rolling elements in any suitable order and number. There may for example be more, less or equal amount rolling elements and wedging locking elements. The rolling elements may for example be rollers or balls. The wedging locking elements may be non-revolving asymmetric locking elements that have a larger length than the distance between the inner and outer races, such that locking elements upon tilting produces a wedging action.

Another example category of one-way clutch bearings comprises wedging locking elements that are designed to slide along continuous cylindrical surfaces of the inner and outer races while providing the necessary radial supporting of the bearing.

Still a further example category of one-way clutch bearings comprises rolling elements that cooperate with a non-cylindrical surface of the inner and outer races. The wedging effect is then be accomplished by wedging surface on the inner and/or outer race. The rolling elements may be preloaded toward a locking position where the rolling elements are wedged between for example a ramp and an inner surface of the counteracting ring.

Bearing cages may be provided to control the internal position of the rolling elements and wedging locking elements.

According to an example aspect of the disclosure the torque equalizer comprises a spring sealing arrangement for sealingly enveloping the at least one spring element. This arrangement enables provision of lubrication in the cavity in which the at least one spring element is positioned, thereby reducing noise from and wear of the decoupler assembly caused by sliding contact between the at least one spring element and inner and/or outer member.

According to a further example aspect of the disclosure the spring sealing arrangement can comprise a pair of annular sealing covers arranged on opposite axial sides of the at least one spring element. This solution enables a reliable and efficient sealing performance of the spring sealing arrangement.

According to a further example aspect of the disclosure at least one of the annular sealing covers can be integrally formed with the inner or outer member. This design may result in simplified assembly.

According to a further example aspect of the disclosure both annular sealing covers can be individual parts that are attached to one of the inner or outer member. This solution enables a relatively quick and easy assembly of the torque equalizer.

According to a further example aspect of the disclosure at least one of the inner and outer members can be split into a first and a second part that are disposed side by side along the rotational axis, and an annular sealing cover can be integrally formed with each of the first and second part. This design provides simplified assembly of the torque equalizer.

According to a further example aspect of the disclosure the annular sealing covers can jointly form a generally toric interior surface that is adapted to partly enclose the two arcuate spring elements. This design enables a good control of the shape of the arcuate spring elements during compression condition.

According to a further example aspect of the disclosure the outer member of the torque equalizer may be attached to the inner bearing ring of the one-way clutch. Having the one-way clutch bearing on the outer side of the torque equalizer has the advantage of that torque equalizer has equalized the torque pulses before reaching the one-way clutch bearing, such that the one-way clutch bearing may have a reduced torque transfer capacity.

According to a further example aspect of the disclosure an outer circumferentially extending surface of the outer member of the torque equalizer can be cylindrical and attached to an inner circumferentially extending cylindrical surface of the inner bearing ring. A direct attachment of the outer member to the inner bearing ring enables a compact and cost-efficient design of the decoupler assembly.

According to a further example aspect of the disclosure the inner member of the torque equalizer may be attached to the outer bearing ring of the one-way clutch. By providing the one-way clutch bearing on the inner side of the torque equalizer a relatively small one-way clutch bearing is required thereby reducing cost. Moreover, the structural strength and rigidity of a shaft adapted to carry the decoupler assembly enables use of a less rigid design of the inner ring of the one-way clutch bearing, such that cost of the decoupler assembly is reduced. Similarly, the structural strength and rigidity of the torque equalizer located outside and surrounding the one-way clutch bearing enables use of a less rigid design of the outer ring of the one-way clutch bearing, such that cost of the decoupler assembly is reduced.

According to a further example aspect of the disclosure an inner circumferentially extending surface of the inner member can be cylindrical and attached to an outer circumferentially extending cylindrical surface of the outer bearing ring. A direct attachment of the inner member to the outer bearing ring enables a compact and cost-efficient design of the decoupler assembly.

According to a further example aspect of the disclosure the inner or outer member of the torque equalizer may have a dual functionality in that it also functions as the inner or outer bearing ring of the one-way clutch bearing. Depending on whether the torque equalizer is located on the inside or outside of the one-way clutch bearing, the inner or outer member of the torque equalizer may thus additionally comprise the inner or outer race of the one-way clutch bearing. Thereby, a more compact decoupler assembly made of fewer parts may be provided.

According to a further example aspect of the disclosure each of the two arcuate spring elements has a diameter in the range of 10-35 millimetres, specifically in the range of 13-27 millimetres, and more specifically in the range of 17-23 millimetres.

According to a further example aspect of the disclosure each of the two arcuate spring elements, in a natural state of the decoupler, extends over an angle of at least 60 degrees, specifically at least 80 degrees, more specifically at least 100 degrees, and still more specifically at least 120 degrees.

According to a further example aspect of the disclosure a circumferential length of each arcuate spring element in a natural state is larger than the corresponding circumferential length available between a driving surface of the inner member and reaction surface of the outer member, such that each of the two arcuate spring elements constantly are in a compressed state.

According to a further example aspect of the disclosure each of the two arcuate spring elements has a helical winding.

According to a further example aspect of the disclosure each of the two arcuate spring elements has a variable spring constant over the compression range of the arcuate spring element.

According to a further example aspect of the disclosure each of the two arcuate spring elements comprises an inner spring and an outer spring, wherein the inner spring is located within the outer spring, and wherein the lengths of the inner and outer springs are different.

According to a further example aspect of the disclosure each of the two arcuate spring elements comprises a varying helical pitch along the length of the arcuate spring element.

According to a further example aspect of the disclosure the inner member, the outer member, and the two arcuate spring elements are arranged in the same radial plane.

According to a further example aspect of the disclosure consecutive laps of the spiral spring element are positioned overlappingly with respect to each other, such that all laps of the spiral spring element are located in the same radial plane.

According to a further example aspect of the disclosure the spiral spring element, in natural state of the decoupler assembly, extends over 0.75-3 laps, specifically over 1-2 laps, from an attachment location at the inner member to an attachment location at the outer member.

According to a further example aspect of the disclosure the first side of the rubber-based spring element is rotationally fastened to an outer substantially cylindrical surface of the inner member or an axial surface of an outwardly extending flange of the inner member, and wherein the second side of the rubber-based spring element is rotationally fastened to an inner substantially cylindrical surface of the outer member or an axial surface of an inwardly extending flange of the outer member. The different fastening arrangements of the rubber-based spring element to the inner and outer member results in different damping characteristics, thereby enabling tuning of the decoupler to the specific circumstances.

According to a further example aspect of the disclosure the rubber-based spring element comprises a single rubber-based member rotationally fastened to both the inner and outer members, or the rubber-based spring element comprises at least a first rubber-based member rotationally fastened to the inner member and a second rubber-based member rotationally fastened to the outer member. Use of a single or plurality of rubber-based members in the decoupler enables tuning of the decoupler to the specific circumstances.

According to a further example aspect of the disclosure the decoupler assembly has an internal diameter in the range of 50-90 millimetres, specifically in the range of 60-80 millimetres, and wherein the decoupler assembly has an external diameter in the range of 110-180 millimetres, specifically in the range of 130-160 millimetres, and more specifically in the range of 140-150 millimetres.

According to a further example aspect of the disclosure each of the two arcuate spring elements has one end arranged to be drivingly in contact with a driving surface of the inner member and an opposite end arranged to be drivingly in contact with a reaction surface of the outer member.

According to a further example aspect of the disclosure each of the first and second parts further comprises a side wall, wherein the first and second side walls jointly form a generally toric interior surface that is adapted to partly enclose the two arcuate spring elements.

According to a further example aspect of the disclosure one end of the spiral spring element is connected to the inner member and the opposite end of the spiral spring element is connected to the outer member.

According to a further example aspect of the disclosure the decoupler assembly comprises a layer of elastic material disposed on a radially inner side of the inner member, or a radially outer side of the outer member, or on an inner or outer side of the one-way clutch bearing.

According to a further example aspect of the disclosure the plurality of wedging locking elements are any of balls, rollers, sprags, or sliding wedges, or the like.

According to a further example aspect of the disclosure the decoupler assembly comprises at least four wedging locking elements, specifically at least six wedging locking elements According to a further example aspect of the disclosure the decoupler assembly further comprises a pulley that is rotationally attached to an exterior part of the decoupler assembly, wherein an interior part of the decoupler assembly is adapted to be coupled to a rotational output shaft of a power source for rotation therewith, and wherein the decoupler assembly is arranged to transmit torque from the output shaft to the pulley.

According to a further example aspect of the disclosure the decoupler assembly comprises an inner cylindrical surface adapted to be pressed onto an exterior surface of a shaft, and an outer cylindrical surface adapted to have another object, such as a pulley, pressed on thereto.

The disclosure further relates to a power source comprising a rotational output shaft and a decoupler assembly described above, wherein the decoupler assembly is rotationally fastened to the output shaft of the power source.

BRIEF DESCRIPTION OF DRAWINGS

In the detailed description below reference is made to the following figures, in which:

FIG. 4a shows an axial cross-section of the decoupler of FIG. 2, FIG. 4b shows schematically an arcuate spring element of FIG. 4a in a natural state, FIG. 11A shows a radial cross-section of the fourth embodiment, and FIG. 11B-11L shows various alternative variations of the fourth embodiment.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiment, but are applicable on other variations of the disclosure.

Figure 1:
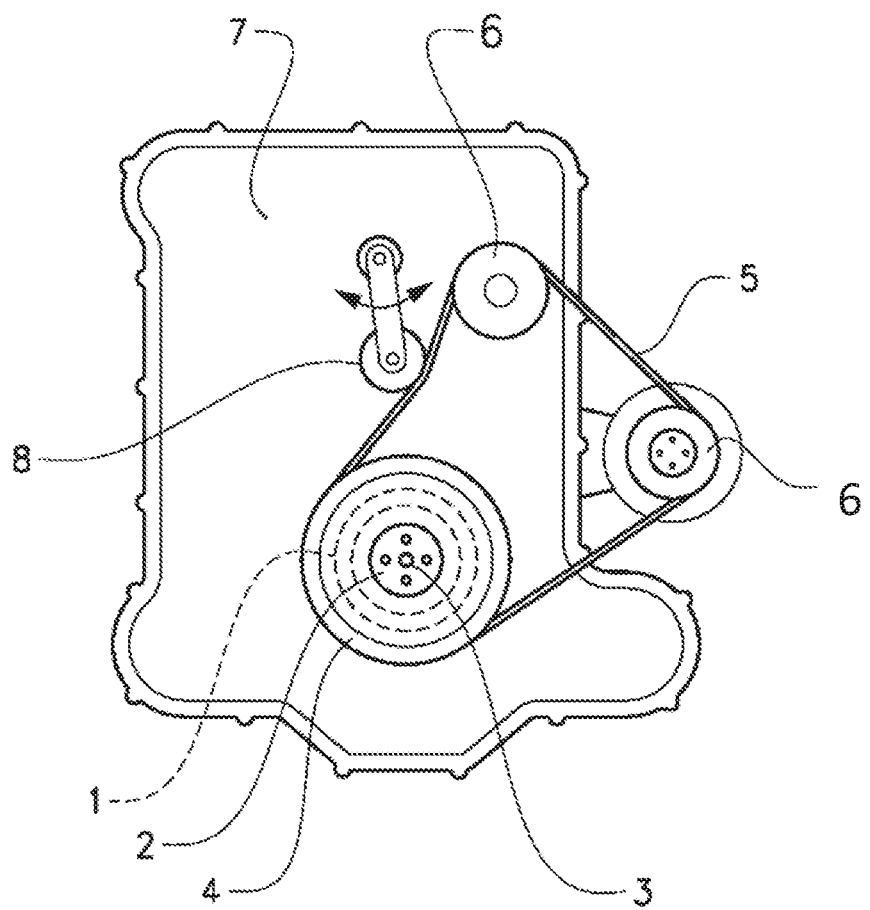
FIG. 1 shows a schematic overview of an engine having a decoupler according to the disclosure connected to the crank shaft.

FIG. 1 of the drawings shows a first schematic implementation of the decoupler assembly 1 constructed in accordance with the teachings of the present disclosure. The decoupler assembly 1 is here shown mounted on a drive hub 2 that is rotationally attached to output member 3 (e.g., crankshaft) of a power source, such as a combustion engine 7. A pulley 4 is rotationally attached to an exterior part of the decoupler assembly 1. In the particular example provided, the decoupler assembly 1 is arranged to transmit torque and rotary power from the output member 3 via an endless power transmitting element 5, such as a belt or a chain, to input members 6, such as pulleys or sprockets associated with engine accessories, such as an air conditioning compressor, an alternator, a power steering pump, a supercharger and the like. A spring-loaded tensioning device 8 is also provided for maintain a certain tension of the power transmitting element 5 to avoid slip.

Figure 2:
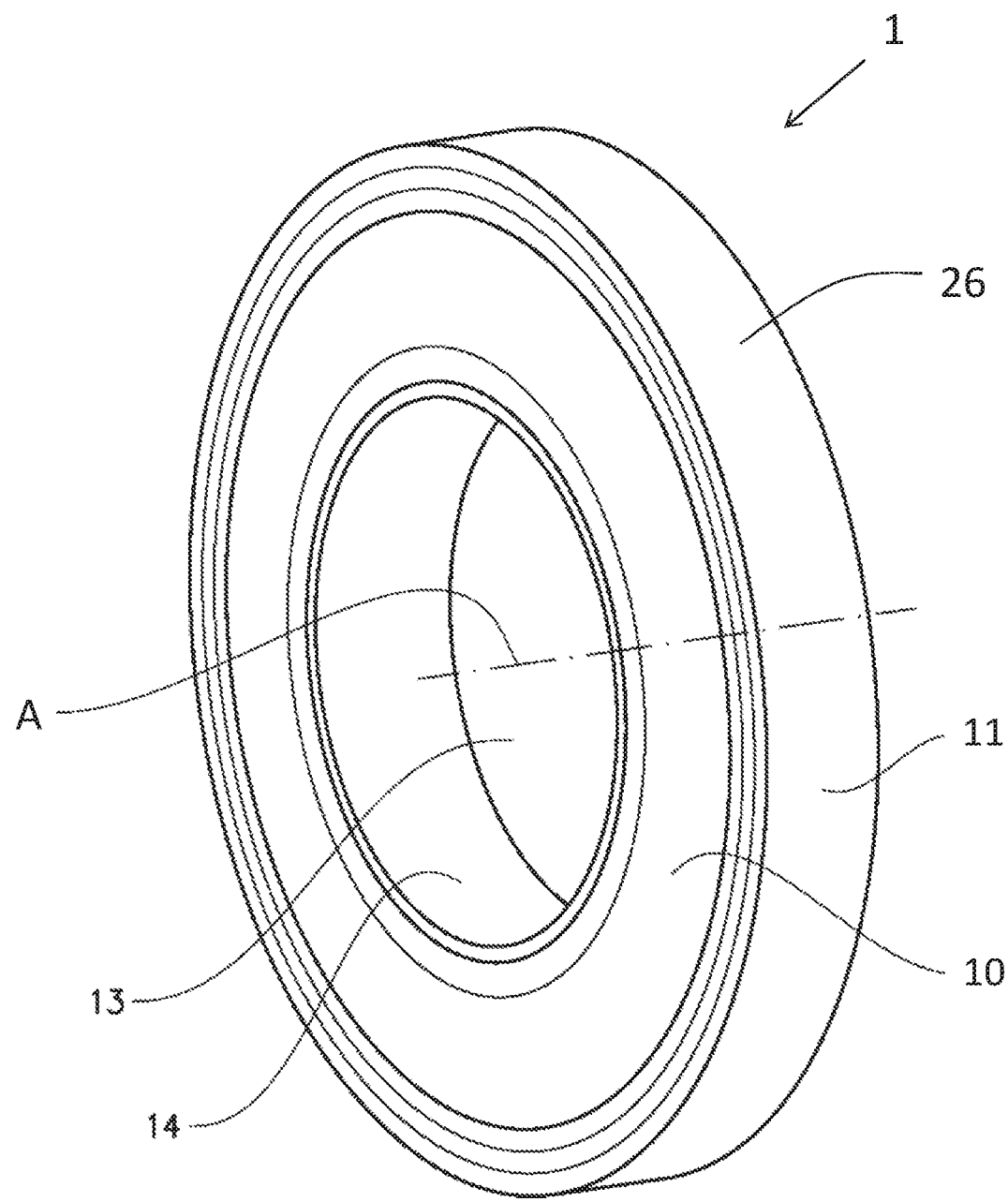
FIG. 2 shows a perspective view of a decoupler according to the disclosure.
Figure 3:
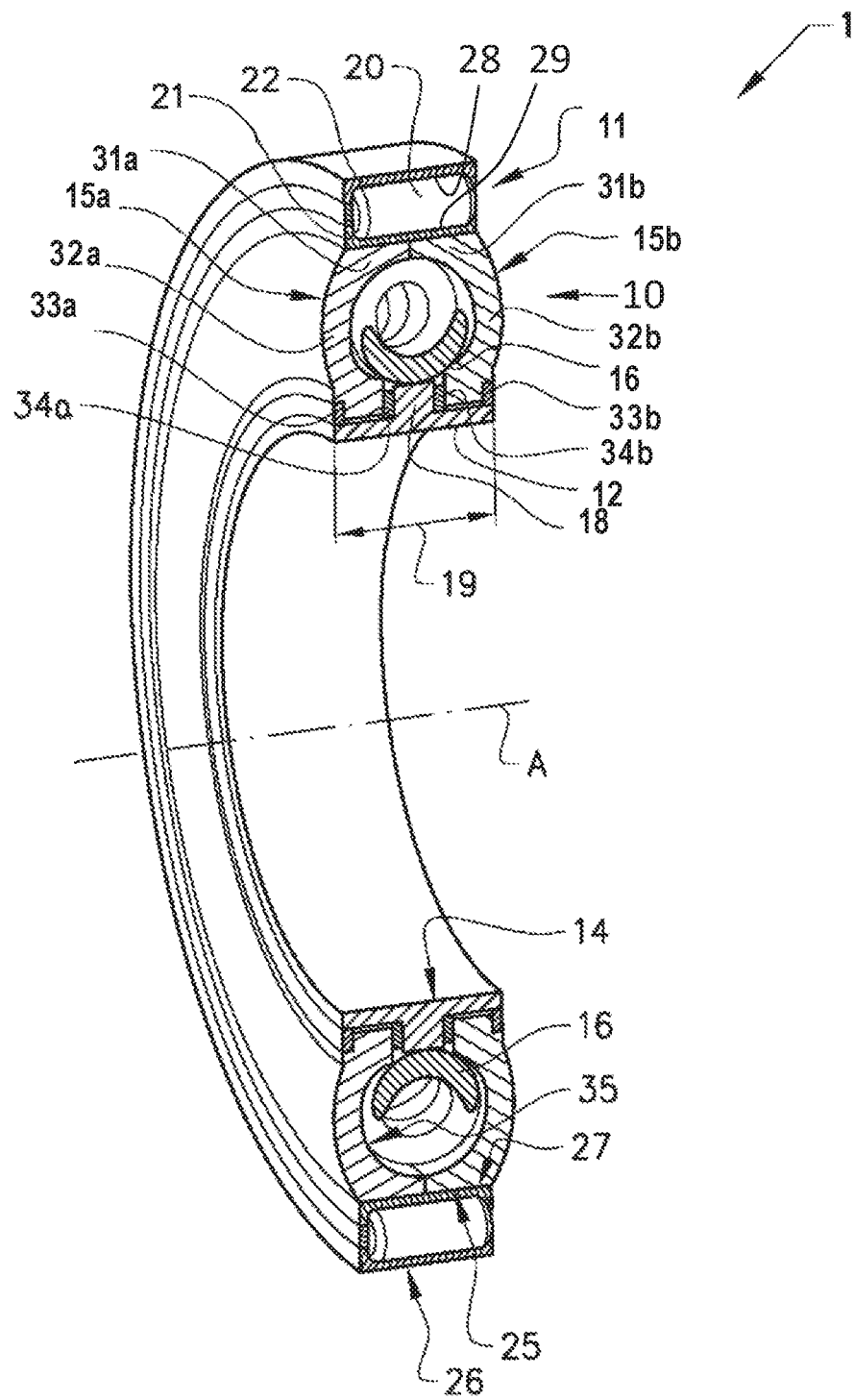
FIG. 3 shows a radial cross-section of the decoupler of FIG. 2.

With reference to FIGS. 2, 3 and 4a, the decoupler assembly 1 as such is illustrated, wherein FIG. 2 shows a perspective overview of the decoupler assembly 1, FIG. 3 shows a section view of the decoupler assembly 1 in a radial plane R coinciding with a rotational axis A, FIG. 4a shows a central section view of the decoupler assembly in a radial plane R perpendicular to the rotational axis A and FIG. 4b shows an arcuate spring element 16 in a natural state.

The decoupler assembly 1 has generally a ring shape and comprises a torque equalizer 10 and a one-way clutch bearing 11. The torque equalizer 10 and one-way clutch bearing 11 are here shown concentrically arranged about a common rotational axis A. The torque equalizer 10 and one-way clutch bearing 11 are also arranged overlapping, such that the torque equalizer 10 is circumferentially surrounded by the one-way clutch bearing 11 to form a compact assembly that exhibits a small axial length. The one-way clutch bearing 11 and torque equalizer 10 are consequently preferably arranged in the same radial plane R. The term radial plane herein refers to a plane that is perpendicular to the rotational axis A.

The torque equalizer 10 comprises an inner member 12, an outer member 15a, 15b and two arcuate spring elements 16. The inner member 12 has an annular shape concentrically arranged about the rotational axis A. The inner member 12 is rotatable with respect to the outer member 15a, 15b.

An arcuate spring element is sometimes alternatively referred to as arc spring, bow spring or curved spring, and is generally an arc-shaped compression spring. The arcuate spring elements 16 is FIG. 4a are located displaced from the rotational axis A and oriented such that a centre point of each arcuate spring element 16, defined by the intersection of two radii drawn from the spring endpoints, is located in centre of the decoupler assembly. The arcuate spring elements 16 are typically made of metal, such as steel. In some applications the arcuate spring elements 16 may alternatively be made of plastic material.

Figure 7:
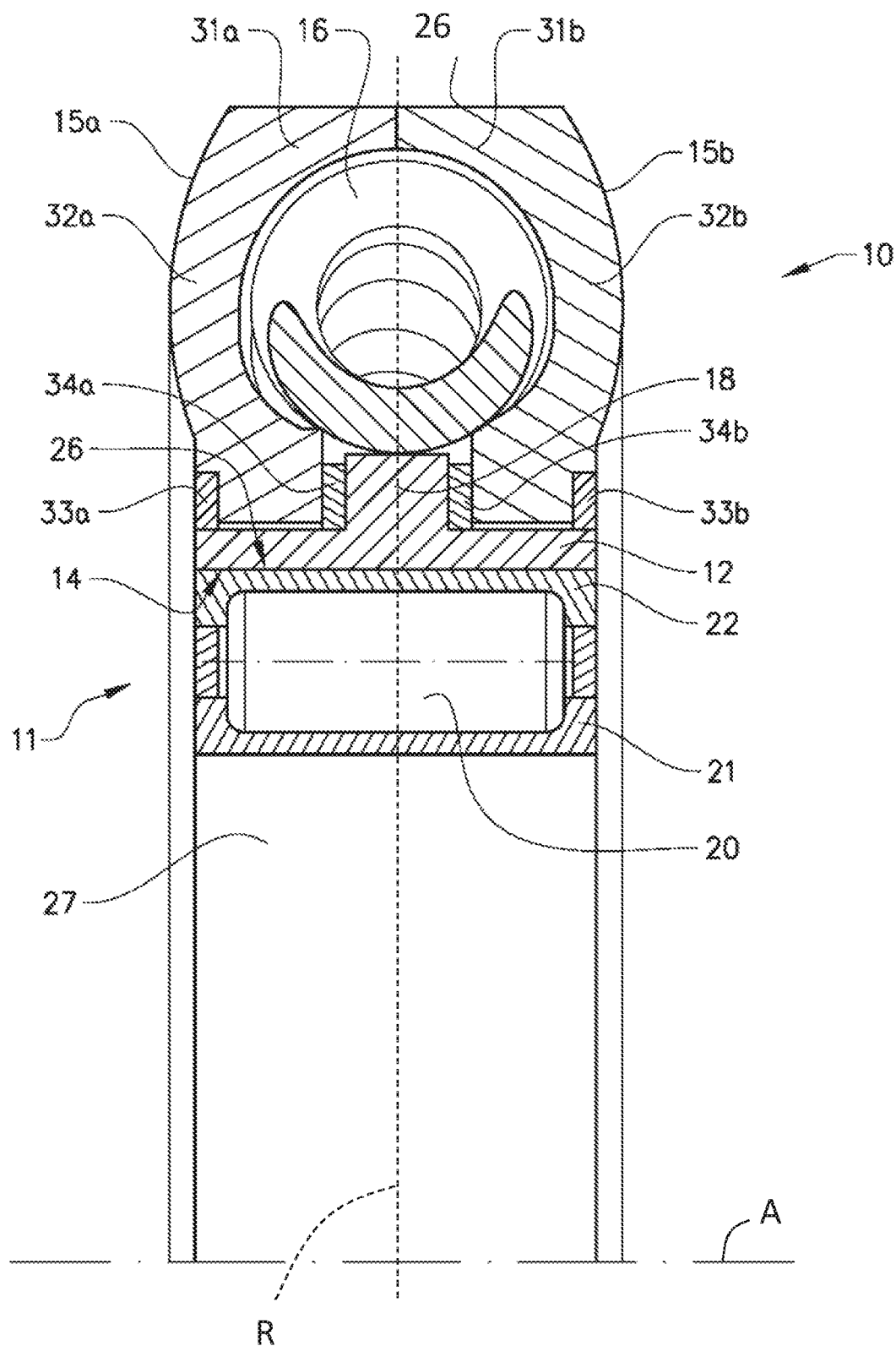
FIG. 7 shows a radial cross-section of a second embodiment of the disclosure.

The inner member 12 has an inner cylindrical surface 14 defining a cylindrical cavity 13 that is adapted to receive the cylindrical drive hub 2. The decoupler assembly 1 may be adapted to be secured to a drive hub 2 by pressing the decoupler into the drive hub 2, such that a cost-efficient and secure connection is realised between the decoupler assembly 1 and drive hub 2. The one-way clutch bearing 11 may additionally have an outer cylindrical surface 26 that is adapted to be connected to an exterior object, such as a pulley, by means of press-fit. This design enables the decoupler assembly 1 to be handled as a single unit, and mounted as a conventional bearing unit. The same advantages effect is obtained also when the one-way clutch bearing 11 is located radially inside of the torque equalizer 10 as shown in FIG. 7.

The decoupler assembly according to this disclosure is primarily designed for transmitting torque levels in the range of 200-700 Nm, specifically in the range of 300-500 Nm. The decoupler assembly may for example have an internal diameter 103, as defined by the inner cylindrical surface 14, in the range of 50-90 millimetres, specifically in the range of 60-80 millimetres. The decoupler assembly may also have an external diameter, as defined by the outer cylindrical surface 26, in the range of 110-180 millimetres, specifically in the range of 130-160 millimetres, and more specifically in the range of 140-150 millimetres.

The inner member 12 is composed of a sleeve shaped portion having an axial extension 19 and an annular radial projection 18 located in a central region along the axial extension 19. The radial projection 18 is provided to form an interior radial support surface for spring elements 16.

The outer member 15a, 15b is disposed concentrically about the inner member 12. The outer member 15a, 15b is in the shown embodiment of FIG. 2-4a composed of a first part 15a and a second part 15b, which parts 15a, 15b are disposed side by side along the rotational axis A. Each of the first and second parts 15a, 15b, comprises a base portion 31a, 31b that exhibits a flat circumferentially extending outer surface 26 that is adapted to contact an inner circumferentially extending cylindrical surface 27 of the one-way clutch bearing 11. Each of the first and second parts 15a, 15b further comprises a side wall 32a, 32b integrally formed with the associated base portion 31a, 31b and extending radially inwards towards the inner member 12.

Annular sliding rings 34a, 34b may be provided in an axial space between the annular radial projection 18 and each side wall 32a, 32b for reducing frictional contact and wear. The first and second side walls 32a, 32b form annular sealing covers arranged on opposite axial sides of the spring elements 16. The second part 15b generally has a mirror-inverted shape of the first part 15a. The first and second side walls 32a, 32b jointly form a generally toric interior surface 35 that is adapted to partly enclose the spring elements 16.

The first and second base portion 31a, 31b, the first and second side wall 32a, 32b and the inner member 12 jointly form a spring sealing arrangement for sealingly enveloping the spring elements 16. This sealing arrangement enables long-term provision of a lubricant in the toric cavity occupied by the spring elements 16, thereby reducing noise and wear of the decoupler assembly caused by sliding contact between the at least one spring element and inner and/or outer member.

Additional sealing rings 33a, 33b, may advantageously be provided to seal the gap between the inner member 12 and the first and second parts 15a, 15b of the outer member. The lubricant provided within the toric cavity occupied by the spring elements 16 can be grease or lubricant oil (e.g., conventional oil, synthetic oil, traction fluid). Additionally or alternatively, a coating or material may be applied to the toric interior surface 35 and/or and the coils of the arcuate spring elements 16 to reduce friction and wear between the generally toric interior surface 35 and the arcuate spring elements 16.

The spring elements 16 are arranged to transmit torque between the inner member 12 and outer member 15a, 15b. This is realised by providing the inner member 12 with two inner flange members 41, each having a driving surface 40 facing a first rotary direction D1 and a tapering abutment surface 42 facing a second rotary direction D2 that is opposite the first rotary direction, and by providing the outer member 15a, 15b with two corresponding outer flange members 44, each having a reaction surface 45 facing the second rotary direction D2 and a tapering abutment surface 46 facing the first rotary direction D1.

The inner flange members 41 project radially outwardly from an outer circumferentially extending surface of the inner member 12, and the outer flange members 44 project radially inwardly from an inner circumferentially extending surface of the outer member 15a, 15b.

The outer flange member 44 can be formed on only one of the first and second parts 15a, 15b, or on both. The circumferential length L1 of the inner flange member 41 and the circumferential length L2 of the outer flange member 44 are relatively small compared with the total circumferential length L5 of the of the space between the driving surface 40 and reaction surface 45 of the inner and outer members 12, 15a, 15, preferably less than 20%, and more preferably less than 10%. The inner and outer flanges 41, 44 may overlap a distance L3 due to the tapering surfaces 42, 46 of the flanges 41, 44, such that a relatively long arcuate spring element 16 can be located between each driving surface 40 and reaction surface 45.

In a non-operating state, each arcuate spring element 16 preferably extends over an angle α of at least 60 degrees, specifically at least 80 degrees, more specifically at least 100 degrees, and still more specifically at least 120 degrees. Increased length of the arcuate spring elements 16 enables working range of the spring elements 16 without reaching a maximal compressed state, thereby enabling improved equalization of the torque.

FIG. 4a shows schematically the shape of an arcuate spring element 16 in a relaxed, natural state. It is clear that the arcuate spring element 16 has an arcuate shaped also in the relaxed state. The circumferential length L4 of each arcuate spring element 16 in a natural state may further be selected to slightly exceed the circumferential length L5 available between the driving surface 40 of the inner member 12 and reaction surface 45 of the outer member 15a, 15b, such that the arcuate spring elements 16 are in constant compressed state. As a result, the arcuate spring elements 16 presses the tapering surfaces 42 of the inner flanges 41 against the tapering surfaces 46 of the outer flanges 44. Thereby, noise, vibration, and harshness (NVH) generated by the torque equalizer during certain operating conditions can be reduced. The arcuate spring elements 16 can be helical coil spring elements having an arcuate natural shape.

Each of the two arcuate spring elements has a diameter 100 in the range of 10-35 millimetres, specifically in the range of 13-27 millimetres, and more specifically in the range of 17-23 millimetres. Relatively large arcuate spring elements enable a robust design with high torque equalization capacity.

The arcuate spring elements 16 in FIG. 4a may have a substantially constant spring constant over the operating compression range of the arcuate spring element. That means that the force needed to extend or compress a spring by a certain distance is proportional to that distance, until the spring bottoms out. However, in certain application is may be desirable to have a variable spring constant. For example when the necessary compression force should increase more than proportional to the compression distance. This can be accomplished be having each arcuate spring element 16 being composed of two individual arcuate springs that are arranged telescoped, and where one of the telescoped springs is longer than the other. Either the inner or outer spring of the telescoped arcuate spring element 16 may be the longer spring. Upon an initial compression stage of the arcuate spring element 16 composed of two telescoped springs with different lengths, only one longer spring will become increasingly compressed. After a certain compression distance also the other spring will start to become increasingly compressed. This design provides a step-wise increase in the spring constant of the arcuate spring element 16. Alternatively, each of the two arcuate spring elements may comprise a varying helical pitch along the length of the arcuate spring element for providing a varying spring constant.

The one-way clutch bearing 11 comprises an inner bearing ring 21 with a cylindrical inner race 29 and an outer bearing ring 22 with a cylindrical outer race 28. The one-way clutch bearing 11 further comprises a plurality of rolling members 20 and individual wedging locking elements 23 disposed between inner and outer bearing rings 21, 22. The rolling members 20 are in the disclosed example embodiment designed as cylindrical rollers but other designs are possible within the scope of the disclosure. One individual wedging locking element 23 is located between every neighbouring rolling member 20. However, other configurations are possible. The individual wedging locking elements 23 are designed to lock the inner and outer members 12, 15a, 15b against relative rotation in the first rotary direction D1 while enabling relative rotation between the inner and outer members 12, 15a, 15b in the second rotary direction D2. The locking is realised by a pivoting motion of the individual wedging locking elements 23 such that they become wedged between the inner and outer members 12, 15a, 15b, as described in for example documents U.S. Pat. No. 2,307,881, U.S. Pat. No. 3,776,335 or U.S. Pat. No. 2,268,376.

A bearing cage (not shown) may be provided for ensuring correct relative position of the individual wedging locking elements 23 and rolling members 20.

The disclosed design of the one-way clutch bearing 11 only represents one example embodiment and many alternative designs are possible within the scope of the claims. For example, the one-way locking arrangement of the bearing may be implemented using a ramp-type design as disclosed in US2009277739 and U.S. Pat. No. 5,586,434, or using a sprag-type design as disclosed in US2006118379 and U.S. Pat. No. 2,631,706.

The one-way clutch bearing provides all the necessary bearing functionality. The decoupler assembly is thus free from any additional bearing arrangements located next to, side by side, or otherwise, with the one-way clutch bearing of the decoupler assembly. Since the one-way clutch bearing is the sole provider of rotational support of the decoupler assembly a compact design with short axial length is accomplished.

Furthermore, the schematically illustrated one-way clutch bearing 11 is illustrated as being of a rolling bearing type, but it should be appreciated that a sliding bearing type alternatively may be used, such as sprags, sliding wedges, or the like. Rolling bearings are preferred due to their generally reduced heat generation, reduced wear and improved reliability.

The outer member 15a, 15b is, preferably permanently, attached to the inner bearing ring 21 of the one-way clutch bearing 11, for example by clamping, welding, riveting, or the like. An outer circumferentially extending surface 26 of the outer member 15a, 15b is cylindrical and fixedly attached to an inner circumferentially extending cylindrical surface 27 of the inner bearing ring 21.

Figure 5:
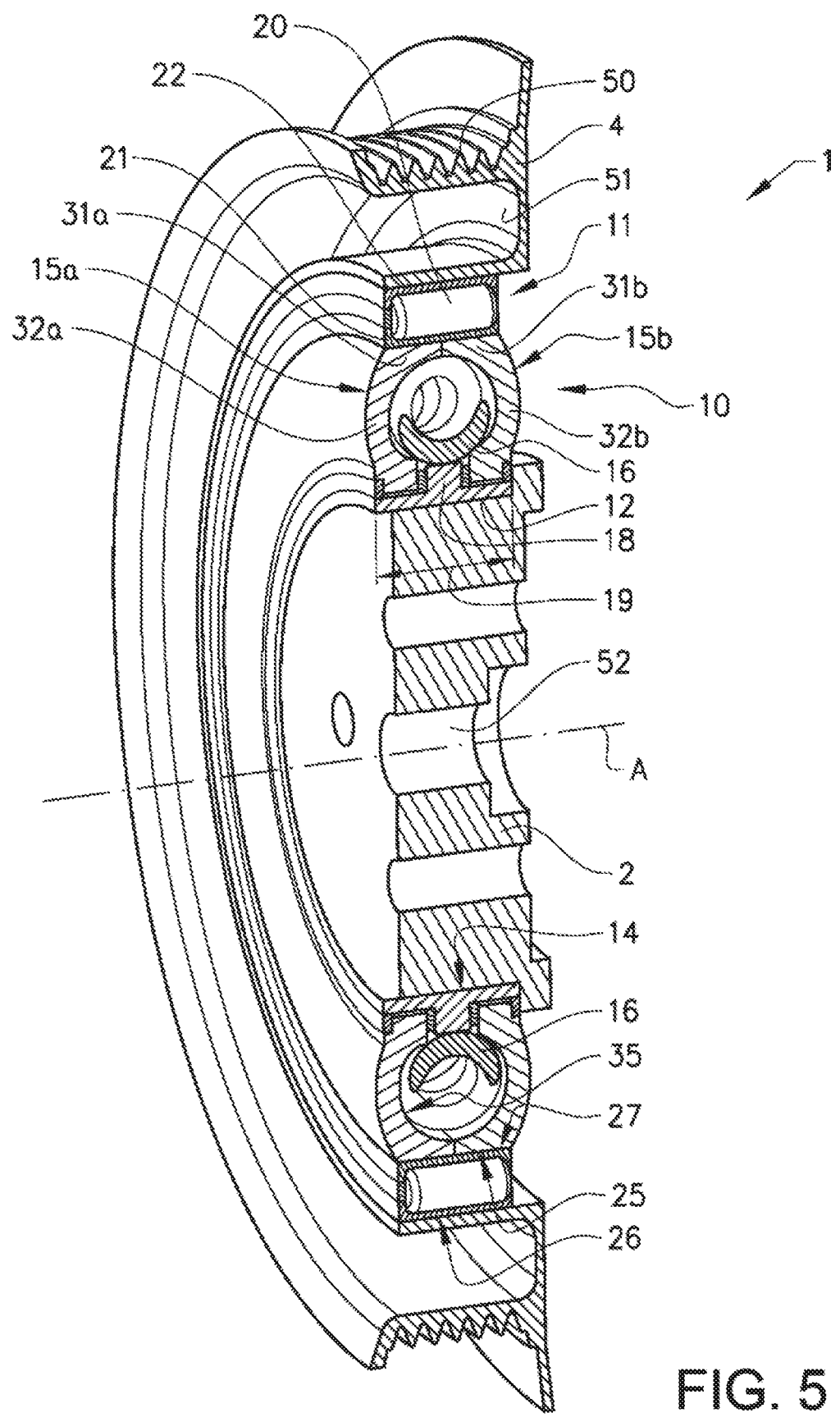
FIG. 5 shows a radial cross-section of the decoupler of the disclosure assembled with a pulley and drive hub.

With reference to FIGS. 1 and 5, a decoupler assembly 1 according to the teaching of the disclosure is shown assembled with the drive hub 2 and the pulley 4. The drive hub comprises a central hole adapted to receive the output member 18 of the engine 7. The drive hub 2 fits within the cylindrical cavity 13 of the inner member 12 and they are mutually rotationally connected, for example by means of clamping, press-fitting, welding, riveting or the like. The pulley 4 is rotationally attached to the outer bearing ring 22, also by means of clamping, press-fitting, welding, riveting or the like. The pulley 4 is adapted to transmit torque and rotary power to the belt or chain to the pulleys or sprockets associated with engine accessories. In the present configuration the pulley comprises a plurality of parallel arranged V-shaped grooves 50 that are arranged to cooperate with a polygroove belt. An annular void 51 is provided in the pulley 4 for encompassing a torsional vibration damper TVD if such a device is included in the assembly.

The function of the decoupler assembly according to the disclosure will now be disclosed with reference to FIGS. 1-5, i.e. in an embodiment where the decoupler assembly is installed to transmit torque from the output member 3 of the engine 7 to the engine accessories via to the pulley 4. With reference to FIG. 1, the engine 7 converts the reciprocating motion of the engine's pistons (not shown) into rotary motion that is output via the output member 18. The rotary motion of the output member 18 is not smooth and continuous but rather oscillates even when the rotational speed of the output member 18 is said to be constant. The hub 2 is driven by the output member 3 (crankshaft) in the first rotary direction D1, such that torque and rotary power is transmitted to the pulley 4 through inner flanges 41, the arcuate spring elements 16, the outer flanges and the one-way clutch bearing 11. Where the output member 3 accelerates at a faster rate than an accessory drive is able to accelerate, the arcuate spring elements 16 can temporarily deform to a significant extent to provide resiliency in the coupling between the inner and outer member 12, 15a, 15b, which permits rotation of the output member 3 in the first rotational direction D1 relative to the outer member 15a, 15b. In this regard, the arcuate spring elements 16 can store energy that can be released to the outer member 15a, 15b over time to permit the outer member 15a, 15b to accelerate to the rotational speed of the output member 3. It will be appreciated from the above discussion that the arcuate spring elements 16 will increasingly deform (e.g., compress in the example provided) as the magnitude of the torque or rotary load transmitted between the inner hub 2 and the pulley 4 increases. It will also be appreciated from the above discussion that the arcuate spring elements 16 provide an equalization of torque pulses and more or less sudden changes in rotary power between the inner hub 2 and the pulley 4.

Upon transmission of a propulsion torque to the inner member 12 from the engine 7 in the first rotary direction D1, the inner member 12 will transmit a force to the arcuate spring elements 16 via the driving surfaces 40. The arcuate spring elements 16 will compress and transmit a force to the outer member 15a, 15b via the reaction surfaces 46 of the outer member 15a, 15b. As a result of the transmitted force applied to the outer member 15a, 15b in the first rotary direction D1, the outer member 15a, 15b will start to rotate in the first rotary direction D1. The inner bearing ring 21, which is permanently attached to the outer member 15a, 15b, will also start to rotate in the first rotary direction D1. Furthermore, since the one-way bearing automatically prevents the outer bearing ring 22 to have a lower rotary speed in the first rotary direction than the inner bearing ring 21, also the outer bearing ring 22 will start to rotate in the first rotary direction D1. When the speed of the inner member 12 in the first rotary direction subsequently suddenly is reduced, the rotary speed of the outer bearing ring 22 may slow down more slowly, because the one-way bearing enables the outer bearing ring 22 to overshoot the speed of the inner bearing ring 21 in the first rotary direction D1. The speed of the outer bearing ring 22 will then slow down due to rotary load of the engine accessories connected to the decoupler, as well as due to internal rotary friction of said engine accessories and the power transmitting element 5.

As described above, the one-way clutch bearing 11 enables the pulley to overspeed the output member 3 of the engine 7. This may occur for example upon sudden deceleration of the engine speed. One or more of the accessories may have a rotational inertia that is sufficiently high so as not to being capable of decelerating to the same extent as the output member 3. In such a case, the inner bearing ring 21 will rapidly decelerate with the engine output member 3 but the outer bearing ring 22 is allowed to rotate with the previous speed. However, the pulley and its associated engine accessories will, in the lack of further rotary power, slowly decelerate until the speed of the pulley 4 has fallen to the speed level of the output member 3. Consequently, the decoupler assembly enables a reduction in speed fluctuations associated with output member 3 in transient operating conditions, such as sudden changes in engine acceleration or deceleration, as well as an equalization of the rotary motion of the pulley 4 upon the slightly oscillating output motion of the output member 3 that is inherently generated by the combustion engine 7.

Figure 6:
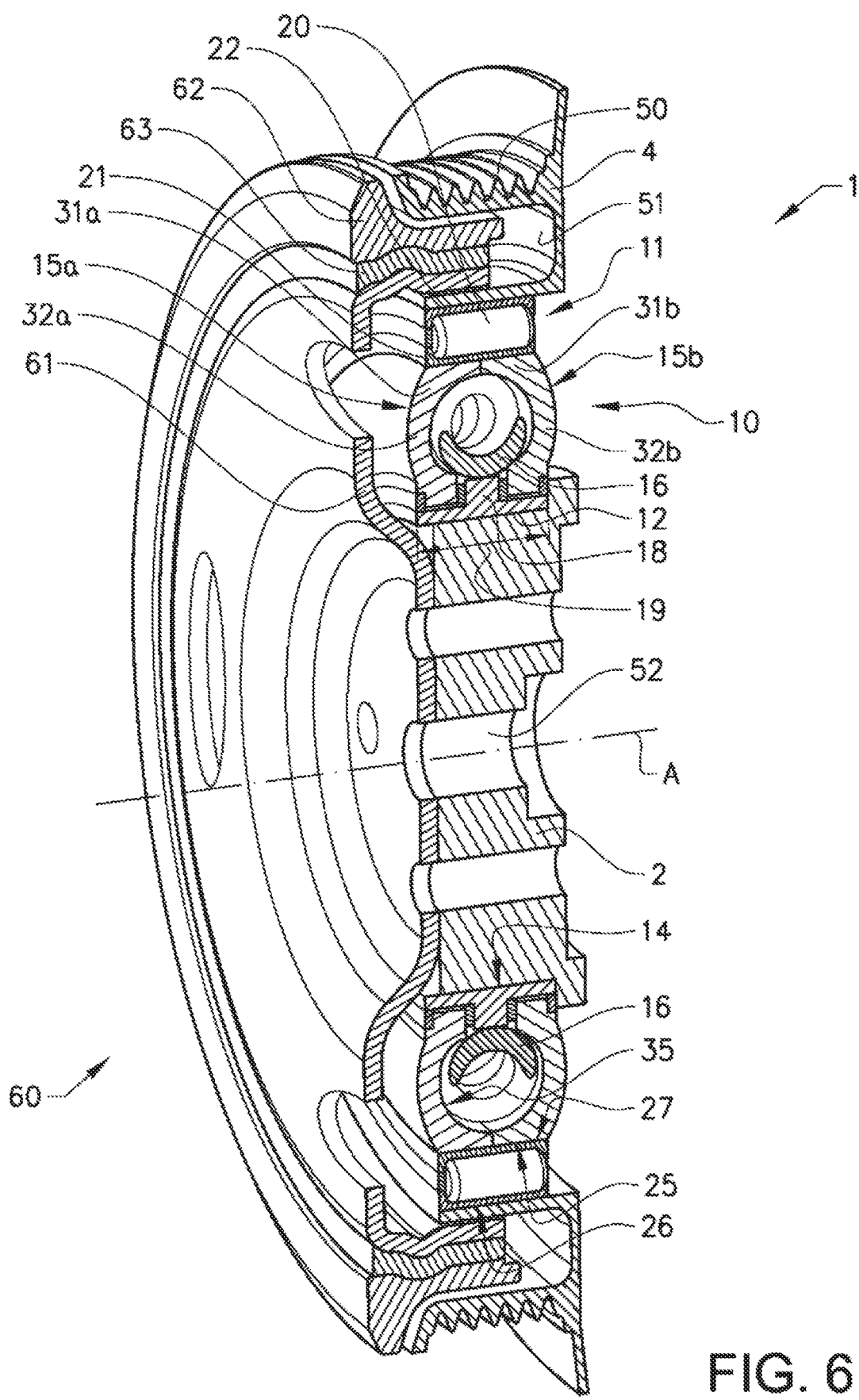
FIG. 6 shows a radial cross-section of the decoupler of FIG. 5 with a torsional vibration damper.

With reference to FIG. 6, a torsional vibration damper TVD 60 can be included to the decoupler of FIGS. 2-4a and/or FIG. 5 if there is a need for damping of changes in rotational speed of the output member 3. A TVD 60 assembly can include a damper hub 61 coupled to the output member 3, an inertia member 62 and a torsionally resilient coupling 63, such as an elastomer, that can couple the damper hub 61 to the inertia member 62. The damper hub 61 can be connected to the drive hub 2 by means of one or more threaded fasteners (not specifically shown) for rotation therewith. The TVD 60 is preferably located within the void 51 provided in the pulley 4 for providing a more compact and less axially extending decoupler assembly. The TVD 60 is configured to attenuate the torsional vibration of the output member 3. It should be appreciated that because the damper hub 61 is coupled to the output member 3 through the drive hub 2, the torsional vibration damper 38 can be employed to attenuate the torsional vibration produced by the engine at a particular frequency regardless of the operation of the torque equalizer 10 and one-way clutch bearing 11.

It should be appreciated that while the decoupler assembly 1 of FIGS. 2-4a, FIG. 5 and/or FIG. 6 is illustrated having two arcuate spring elements 16, integrally formed inner and outer flange members 41, 44, tapering abutment surfaces 42, 46 integrally formed side walls 32a, 32b, split outer member 15a, 15b, and with an inner member 12 is composed of a sleeve shaped portion having an axial extension 19 and an annular radial projection 18 located in a central region along the axial extension 19, a decoupler constructed in accordance with the teachings of the present disclosure may exhibit many different alternative designs with respect to the above-mentioned designs, for example one, three or more arcuate spring elements, separate flange members attached to the inner and/or outer member, radially extending abutment surfaces, the annular sealing covers can be individual parts that are attached to one of the inner or outer member, the outer member may by formed as single piece while the inner member is split into two parts, the inner or outer member may have dual functionality in that it also forms the inner or outer bearing ring of the one-way clutch bearing, and the like.

A second embodiment of the disclosure is shown in FIG. 7. The design and composition of the torque equalizer 10 and one-way clutch bearing 11 are very much the same as in the embodiments of FIG. 2-6 but with the difference that the torque equalizer 10 here is positioned concentrically on the outside of the one-way clutch bearing 11, such that the torque equalizer 10 is surrounded by the one-way clutch bearing 11. The inner circumferentially extending surface 14 of the inner member 12 is here fixedly attached to the outer circumferentially extending cylindrical surface 26 of the outer bearing ring 22. This design enables a smaller one-way bearing arrangement 11 and larger spring elements 16 and may thus be advantageous in certain applications. This design may also be advantageous in applications where the decoupler assembly is arranged to transmit torque from the torque equalizer to the one-way clutch bearing 11, i.e. from the pulley to the shaft. Such an application may occur when the decoupler is installed on a shaft of an engine accessory, such as an alternator, supercharger, fluid pump, or the like. A belt drivingly connecting a pulley installed on the output member 3 with a pulley (not shown) installed on the outer circumferential cylindrical surface 26 of the torque equalizer 10 would be able to transmit torque and rotary power to the shaft of the engine accessory via the torque equalizer 10 and one-way clutch bearing 11 in that order, thereby relieving the one-way clutch bearing 11 from potential torque pulses.

Figure 8:
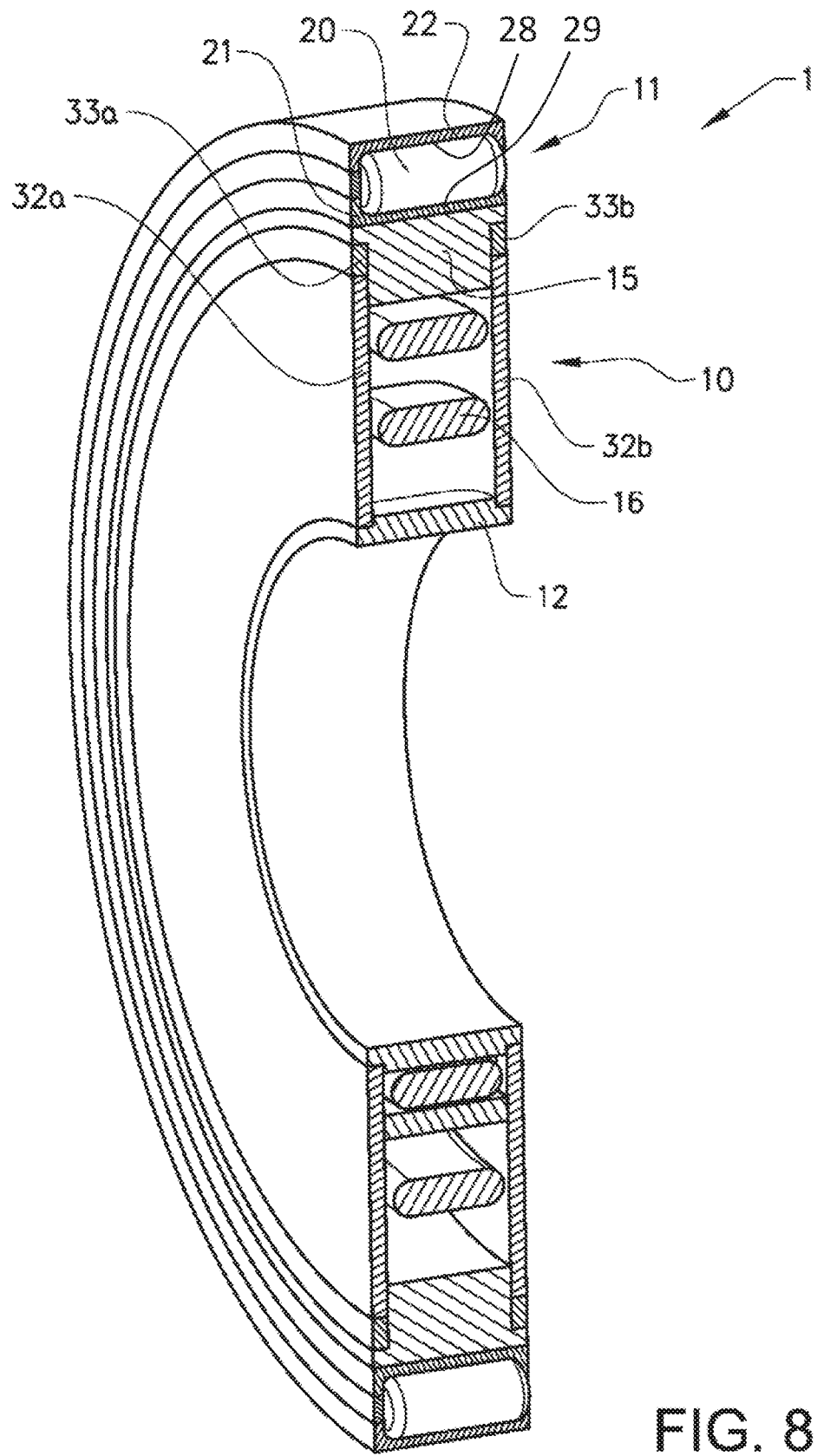
FIG. 8 shows a radial cross-section of a third embodiment of the disclosure.
Figure 9:
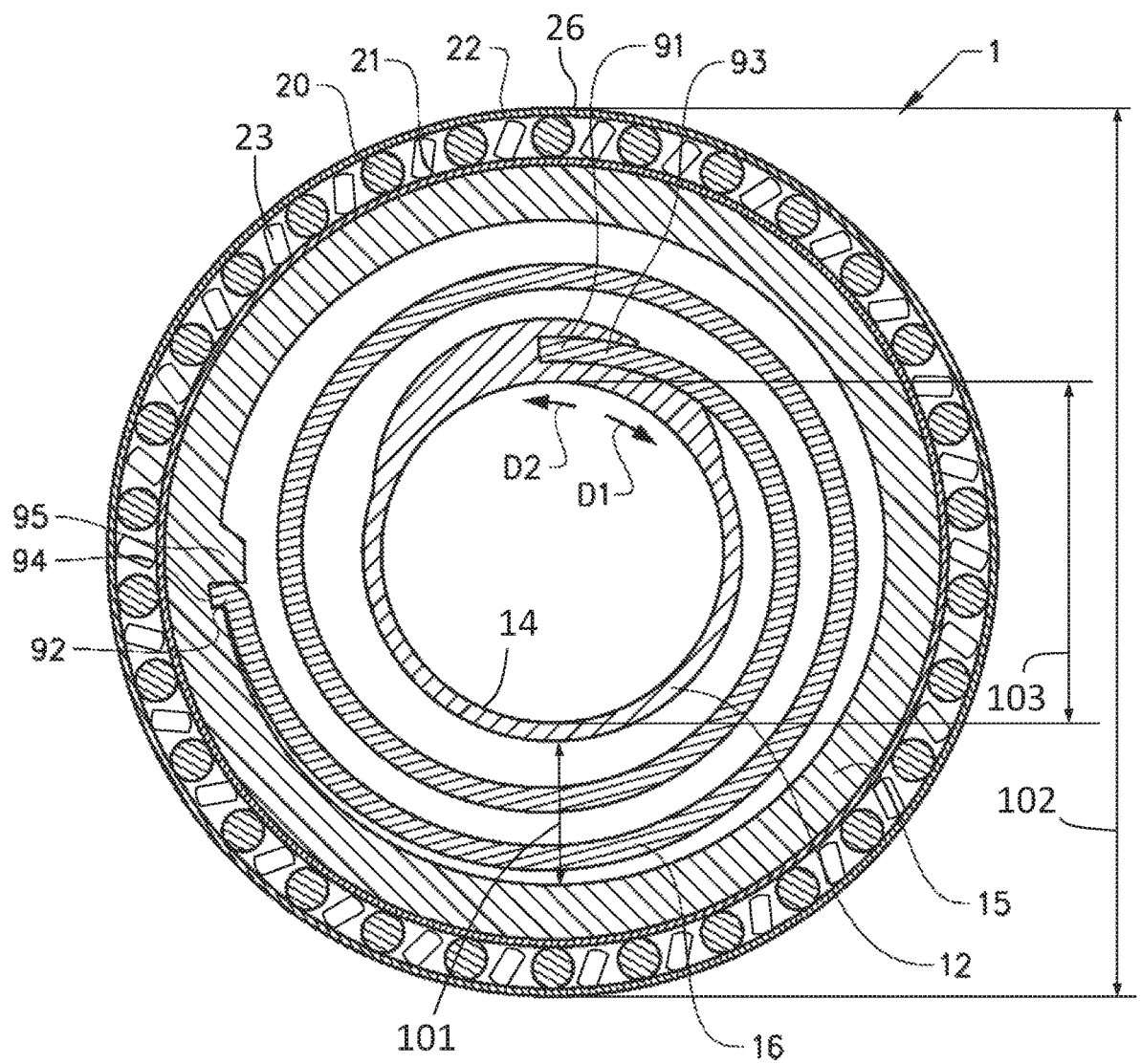
FIG. 9 shows an axial cross-section of the third embodiment of the disclosure.

A third embodiment of the disclosure is shown with reference to FIGS. 8 and 9, wherein FIG. 8 shows a section of the decoupler in an axial plane and FIG. 9 shows a section of the same decoupler embodiment in the radial plane R. This embodiment share many aspects with the embodiment of FIGS. 3 and 4a, and these parts will not be discussed in depth again. In short, the decoupler assembly 1 comprises a torque equalizer 10 located concentrically inside and attached to a one-way clutch bearing 11. The one-way clutch bearing 11 may be identical as previously described and will not be further discussed. Annular sealing covers 32a, 32b are fastened to the inner member 12 on opposite axial sides of the spring element 16. Additional sealing rings 33a, 33b are provided to seal the gap between the outer member 16 and the annular sealing covers 32a, 32b.

The torque equalizer 10 differs mainly in the type of spring element used for transmitting torque to rotary power between the inner and outer members 12, 15. In the previous solution described with reference to FIGS. 2-7, two arcuate spring elements 16 were used, but here a spiral spring is used instead. One end of the spiral spring element 16 is connected to the inner member 12 and the opposite end of the spiral spring element is connected to the outer member 15. Both ends of the spiral spring element 16 are preferably permanently attached to the associated decoupler members 12, 15 to avoid noise during use of the decoupler, but a floating mounting of one or both of the ends of the spiral spring element 16 is possible.

Consecutive laps of the spiral spring element are positioned overlappingly with respect to each other, such that all laps of the spiral spring element are located in the same radial plane. This enables a compact decoupler assembly with a low axial length.

The spiral spring element 16 is typically made of metal, such as steel. In some applications the spiral spring element 16 may alternatively be made of plastic material.

The inner end 91 of the spiral spring element 16 is clamped to the inner member 12 by means of an attachment groove 93, which extends in the circumferential direction and which is open towards the first rotary direction D1. The outer end 92 of the spiral spring element 16 is positioned within a radially outwards extending groove 94 of the outer member 15. One side of the groove 94 is provided with a radially inwards extending projection 95 that serve as an abutment surface for the outer end 92 of the spiral spring element 16. However, the disclosed attachment of the spiral spring element 16 to the inner and outer member 12, 15 respectively should be interpreted as a single exemplary embodiment out of many possible variants, all included within the scope of the appended claims.

Upon transmission of a propulsion torque to the inner member 12 from the engine 7 in the first rotary direction D1, the inner member 12 will together with the inner end 91 of the spiral spring element 16 start to rotate in the first rotary direction D1. The outer member 15 is at stillstand and the spiral spring element 16 will consequently expand while transmitting an increasing force to the outer member 15. As a result of the transmitted force applied to the outer member 15 in the first rotary direction D1, the outer member will start to rotate in the first rotary direction D1. The inner bearing ring 21, which is permanently attached to the outer member 15, will also start to rotate in the first rotary direction D1. Furthermore, since the one-way bearing automatically prevents the outer bearing ring 22 to have a lower rotary speed in the first rotary direction than the inner bearing ring 21, also the outer bearing ring 22 will start to rotate in the first rotary direction.

When the speed of the inner member 12 in the first rotary direction subsequently suddenly is reduced, the rotary speed of the outer bearing ring 22 may slow down more slowly, because the one-way bearing enables the outer bearing ring 22 to overshoot the speed of the inner bearing ring 21 in the first rotary direction D1. The speed of the outer bearing ring 22 will then slow down due to rotary load of the engine accessories connected to the decoupler, as well as due to internal rotary friction of said engine accessories and the power transmitting element 5.

Depending on the spring constant of the spiral spring element 16 and the applied torque, a fully loaded spring state may be reached, i.e. a state where the spiral spring element 16 is maximally compressed and cannot be further compressed. In this state, subsequent laps of the spiral spring element 16 will establish mutual radial contact.

The spiral spring element 16 disclosed in FIG. 9 extends, in natural state of the decoupler assembly, over about 1.75 laps. The spiral spring element 16 may however have another length and shape. The spiral spring element 16 may for example extend over 0.75-3 laps, specifically over 1-2 laps, from an attachment location at the inner member 12 to an attachment location at the outer member 15 in natural state of the decoupler assembly. The distance 101 between the outer cylindrical surface of the inner member 12 and the inner cylindrical surface of the outer member 15 in the radial direction may be in the range of 10-60 millimetres, specifically in the range of 20-50 millimetres, and more specifically in the range of 20-40 millimetres.

The decoupler assembly 1 described above with reference to FIGS. 1-9 may additionally be provided with a layer of elastic material (not shown) between the torque equalizer 10 and one-way clutch bearing 11, or at another cylindrical surface of the decoupler assembly 1, for the purpose of providing additional damping of vibration and noise transfer through the decoupler assembly 1. The elastic material layer may for example be disposed on a radially inner side of the inner member 12, or a radially outer side of the outer member 15, or on an inner or outer side of the one-way clutch bearing.

Figure 10:
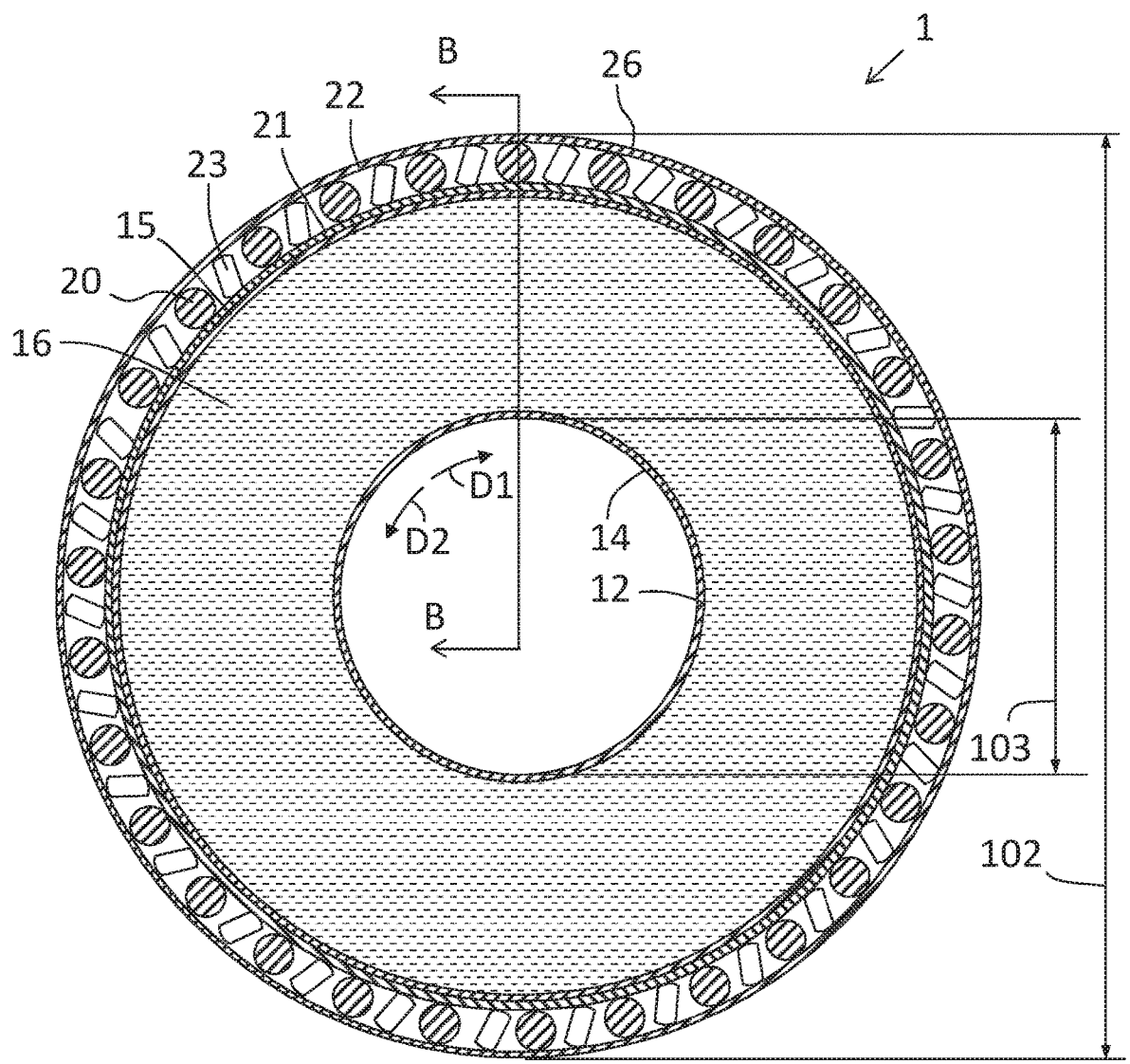
FIG. 10 shows an axial cross-section of the fourth embodiment of the disclosure.
Figure 11G:
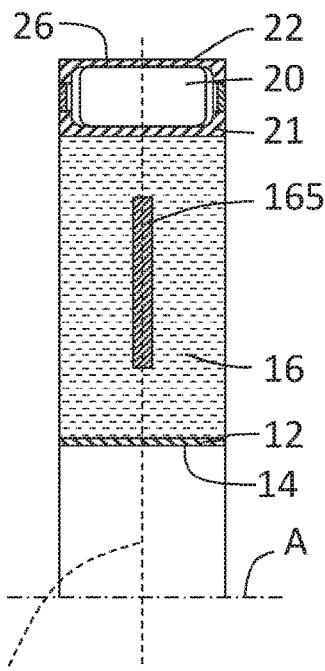

A fourth example embodiment of the disclosure is shown with reference to FIGS. 10 and 11A, wherein FIG. 10 shows a section of the decoupler in an radial plane R and FIG. 11A shows a section of the same decoupler embodiment in the axial plane. The decoupler comprises a torque equalizer 10 and a one-way clutch bearing 11. The configuration, design and functionality of the one-way clutch bearing 11 is identical with the embodiments of FIGS. 3, 4a, 5-9 and will therefore not be repeated in depth again. In short, the one-way clutch bearing 11 comprises an outer race 28, an inner race 29, and a plurality of individual wedging locking elements 23 that are disposed between the inner and outer race 28, 29. The one-way clutch bearing 11 is located in the same radial plane R as torque equalizer 10 and rotationally connected to the outer member 15.

The torque equalizer 10 comprises according to the fourth embodiment an inner member 12 having a rotational axis A, an outer member 15 disposed concentrically and surrounding the inner member 12, and a rubber-based spring element 16 arranged between the inner member 12 and outer member 15. The main purpose of the rubber-based spring element 16 is to transmit torque between the inner member 12 and outer member 15, while dampening and smoothening high angular acceleration.

A torque equalizer comprising a rubber-based spring element 16 may be advantageous over use of metal spring elements in certain applications, in particular low torque applications, such as up to about 250 Nm, specifically up to about 200 Nm. A torque equalizer comprising a rubber-based spring element 16 generally has a lower angular operating range that a metal spring based torque equalizer, such as for example up to about 20 degrees, specifically up to about 30 degrees, and more specifically up to about 40 degrees, thereby making it more suitable for low torque applications, but a rubber-based torque equalizer generally has a lower weight and may be manufactured more cost-efficiently. Moreover, a rubber-based torque equalizer inherently provides improved noise dampening compared with metal spring based torque equalizers.

A first side of the rubber-based spring element 16 is rotationally fastened to the inner member 12 and a second side of the rubber-based spring element 16 is rotationally fastened to the outer member 15. The fastening may for example be accomplished by adhesive or glue, by mechanical fastening, such as clamping, or by moulding the rubber-based spring element directly on the inner and outer members 12, 15 respectively. The inner and/or outer members 12, 15 may be provided with projections, recesses, apertures, or the like in any form for improving the rotational fastening of the inner and outer members 12, 15 to the rubber-based spring element 16.

The rubber-based spring element 16 is designed and made of a material that enables the inner member 12 to be rotationally displaceable relative to the outer member 15 at least 20 degrees, specifically at least 30 degrees, and more specifically at least 40 degrees solely based upon elastic deformation of the rubbed-based spring element 16. It is consequently the elastic deformation of the rubber-based spring element 16 that renders the decoupler 1 its torque-equalization capacity. The rubber-based spring element 16 may for example be made of one, two or more continuous rings of elastic material.

In the example embodiment of FIGS. 10 and 11A the rubbed-based spring element 16 may have an axial thickness 164 in the range of about 10-50 millimetres, specifically 10-30 millimetres. Furthermore, the rubbed-based spring element 16 may have a radial thickness 165 in the range of about 20-150 millimetres, specifically 30-100 millimetres, and more specifically 40-80 millimetres.

In the example embodiment of FIG. 10 the decoupler assembly may have an inner cylindrical surface 14 with an internal diameter 103 in the range of 40-90 millimetres, specifically in the range of 50-70 millimetres, and an outer cylindrical surface 26 may have an external diameter 102 in the range of 110-250 millimetres, specifically in the range of 130-200 millimetres, and more specifically in the range of 150-180 millimetres.

Suitable rubber material may for example be synthetic rubber or natural rubber. Examples of suitable synthetic rubbers, depending the specific circumstances, may be ethylene propylene diene monomer, silicone rubber, polychloroprene, acrylonitrile butadiene, styrene butadiene, fluorinated hydrocarbon, or the like.

In the fourth example embodiment the rubber-based spring element 16 is made of a homogenous annular ring of elastic rubber, wherein the ring has a solid body with a rectangular cross-section, as illustrated in FIGS. 10 and 11A. The rubber-based spring element 16 may however alternatively be made of a non-solid annular ring of elastic rubber as illustrated in FIG. 11B, wherein one or more axially extending apertures 17 are located within the body of the homogenous annular ring. The one or more apertures 17 may have any shape, such as cylindrical, rectangular, elliptical apertures etc., and are generally designed and configured for providing the desired torque equalizing effect. One or more apertures in a centre region of the annular ring of elastic rubber typically results in reduced torsional strength of this area, such that an increased relative rotational displacement between the inner and outer members 12, 15 is provided. A non-solid annular ring of elastic rubber may still more alternatively comprise one or more internal cavities (not showed) configured for providing the desired torque equalizing effect.

According to still an alternative design of the rubber-based spring element 16 as illustrated in FIG. 11C the rubber-based spring element 16 may have a thinner section, as seen in the axial direction 300 of the decoupler, in a centre area of the ring body. This means that both the surface area of the rubber-based spring element 16 that is connected to the inner member 12 and the surface area of the rubber-based spring element 16 that is connected to the outer member 15 are larger than the surface area of a cross-section of the rubber-based spring element 16 in a region between the inner and outer members 12, 15. The relatively large surface areas at the inner and outer members 12, 15 provide the necessary strength of the rotational fastening between the rubber-based spring element 16 and the inner and outer members 12, 15, and the thinner centre region may be designed to provide reduced torsional strength of this area, such that an increased relative rotational displacement between the inner and outer members 12, 15 is provided.

In the fourth example embodiment shown in FIGS. 10 and 11A, the torque equaliser 10 is located radially inside of the one-way clutch bearing 11, and the outer member 15 of the torque equaliser 10 is rotationally fastened to the inner bearing ring 21 of the one-way clutch bearing 11. The internal structure of the decoupler may however be re-arranged as shown in FIG. 11D, such that the torque equaliser 10 is located radially outside of the one-way clutch bearing 11, and the inner member 12 of the torque equaliser 10 is rotationally fastened to the outer bearing ring 22 of the one-way clutch bearing 11. This alternative arrangement of the decoupler 1 is advantageous because it enables the inner bearing ring 21 of the one-way clutch bearing 11 to be made of a relatively thin material, because the inner bearing ring 21 will be supported by the shaft onto which the decoupler is mounted. This design thus enables a more cost-effective design of the rubber-based decoupler.

FIGS. 11E and 11F show two alternative designs for providing improved structural stability of the rubber-based decoupler. The rubber-based spring element 16 generally requires a relatively large diameter size for providing the desired torque equalization performance. A large diameter size may however render the rubber-based spring element 16 less rigid in the axial direction of the decoupler. In applications where the allowed tolerances of the outer surface 26 of the decoupler 1 in the axial direction are small the outer surface 26 may require some type of guidance for fulfilling the desired tolerance limits. In FIG. 11E the inner member 12 is provided with two radially outwardly protruding flanges 121, one flange on each side of the rubber-based spring element 16. The flanges 121 may be integrally formed with the inner member 12, or separate parts that are fastened to the inner member 12.

The flanges are designed to provide the necessary axial support of the rubber-based spring element 16. The length of the flanges 121 in the radial direction 200 is thus selected according to the specific circumstances. In the illustrated example of FIG. 11E the flanges 121 extend all the way to the outer member 15. The outer member 15 may have corresponding flanges 151 extending radially inwardly for engagement with the flanges 121 of the inner member 12 for fulfilling the desired tolerances of the decoupler. The flange 121 may be configured to be in constant sliding contact with the outer member 15, or to have a certain small air gap between the flange 121 and outer member 15.

Still more alternatively, the inner member 12 may have a single flange 121 protruding radially outwardly and cooperating with the outer member 15 for fulfilling the desired tolerances. For example, as shown in FIG. 11F, the outer member 15 may have two axially separated flanges 151 forming an annular groove 152 configured for receiving the edge of the flange 121 of the inner member 12.

In the disclosed example embodiment the flange(s) 121 is fastened to the inner member 12, but the flange may alternatively be fastened to the outer member 15. Moreover, the flanges 121 of the inner or outer member 12, 15 provides a certain level of protection of the rubber-based spring element 16 against dirt and damages caused by contact with neighbouring components.

According to still an example aspect the rubber-based spring element 16 may include one or more rigid members 165. In the example embodiment of the FIG. 11G a rigid disc is embedded within the rubber-based spring element 16. A rigid member inserted into the rubber-based spring element 16 generally results in increased torsional strength of the rubber-based spring element 16, such that a reduced relative rotational displacement between the inner and outer members 12, 15 is provided. A rigid member inserted into the rubber-based spring element 16 generally also results in improved axial stability of the torque equalizer 10.

Figure 11H:
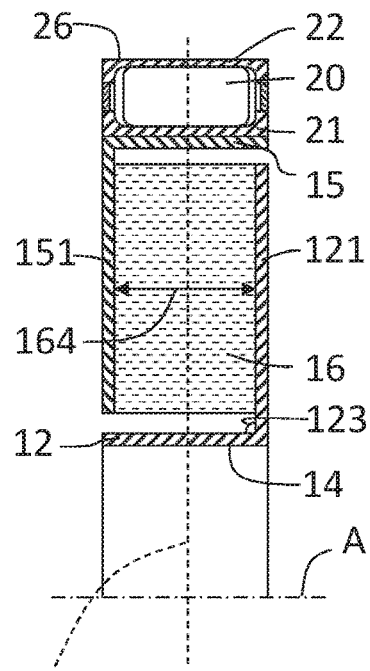

In the example embodiments of FIG. 11A-11G a first side of the rubber-based spring element 16 is rotationally fastened to an outer substantially cylindrical surface of the inner member 12 and the second side of the rubber-based spring element 16 is rotationally fastened to an inner substantially cylindrical surface of the outer member 15. This effectively corresponds to using the radial surfaces of the rubber-based spring element 16 for attachment to the inner and outer members 12, 15. However, the rubber-based spring element 16 may alternatively be fastened to the inner and outer members 12, 15 using its axial surfaces. This is illustrated in FIG. 11H, in which a first side of the rubber-based spring element 16 is rotationally fastened to an axial surface of an outwardly extending flange 121 of the inner member 12, and wherein the second side of the rubber-based spring element 16 is rotationally fastened or an axial surface of an inwardly extending flange 151 of the outer member 15. Using the axial surface of the rubber-based spring element 16 for attachment to the inner and outer member 12, 15 results in entirely different damping characteristics of the torque equalizer and enables the decoupler to be better adapted to the specific circumstances.

Moreover, the flanges 121, 151 of the inner and outer member 12, 15 provides a certain level of protection of the rubber-based spring element 16 against dirt, fuel, heat radiation and aging/damages caused for example by contact with neighbouring components. A further advantage of using the axial surfaces of the rubber-based spring element 16 is potentially increased surface area the rubber-based spring element 16 and the inner and outer member 12, 15 respectively. Increased surface area may be used for improving the safety of the fastening between the rubber-based spring element 16 and inner and outer members 12, 15, especially when adhesive is used. Still a further advantage of having radially protruding flanges 121, 151 is improved axial stability of the outer member 15. This aspect is important when the decoupler must fulfil high tolerance requirements in terms of low axial displacement of the outer member 15.

The flanges may be oriented perpendicular to the axial direction 300, i.e. with an angle 123 of 90 degrees. Alternatively, the flanges may be inclined up to about 30 degrees from said perpendicular direction, i.e. with an angle 123 of about 60-120 degrees. The inclination of the flanges influences the damping characteristics of the torque equalizer because the variation in axial thickness 164 of the rubber-based spring element 16 in the radial direction 200 is directly dependent on the inclination of the flanges. Perpendicular flanges, as disclosed in FIG. 11H results in constant axial thickness 164 of the rubber-based spring element 16 in the radial direction 200. However, since the angular velocity of the rubber-based spring element 16 in use increases with the distance in the radial direction 200 from the rotational centre axis A, an increasing axial thickness 164 of the rubber-based spring element 16 may thus be appropriate with increasing distance from the rotational axis A in the radial direction. This would render the cross-section of the rubber-based spring element 16 to have a shape of a trapezoid, in particular an isosceles trapezoid.

Figure 11I:
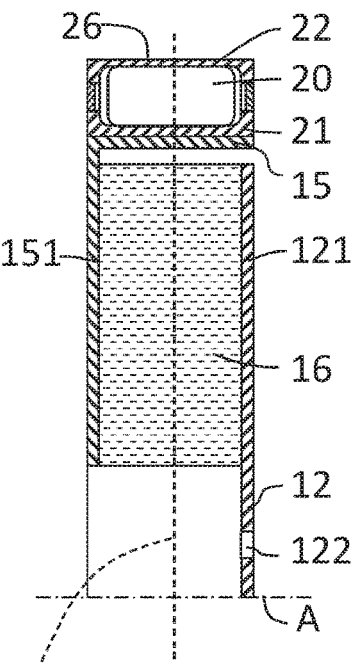

In the example embodiment of FIG. 11I the inner member 12 does not comprises an inner cylindrical surface 14 suitable for being mounted onto a shaft. Instead, the inner member 12 comprises a central disc-shaped region oriented in a radial plane and suitable for being mounted on an axial surface of a shaft or the like, for example using axially extending threaded members that penetrate one or more apertures 122 in the central disc-shaped region of the inner member 12.

Figure 11J:
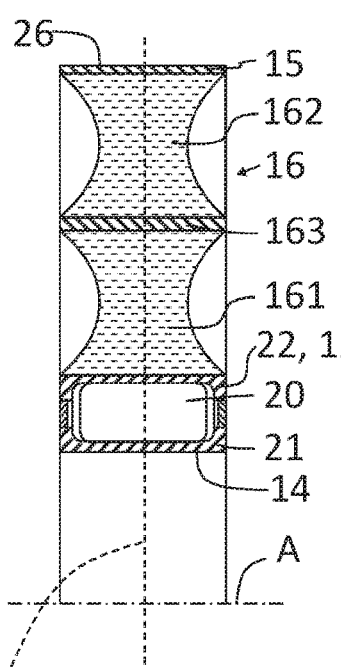

In the example embodiments of the rubber-based spring element 16 shown in FIGS. 11A-11I the rubber-based spring element comprises a single rubber-based member rotationally fastened to both the inner and outer member. This design is relatively robust and enables a cost-efficient manufacturing. However, according to still a further example embodiment illustrated in FIG. 11J the rubber-based spring element 16 may alternatively comprise a first rubber-based member 161 rotationally fastened to the inner member 12 and a second rubber-based member 162 rotationally fastened to the outer member 15, and wherein the first and second rubber-based members 161, 162 are mutually connected by means of a an intermediate member 163, for example in form of a rigid ring. The design enables more complex damping characteristics of the rubber-based spring element 16 and larger flexibility in terms of tuning for better adopting the rubber-based spring element 16 to the specific circumstances. For example, the first and second rubber-based members 161, 162 may be made of different rubber materials having different elasticity, as well as different shape and size. The intermediate member 163 may also be used for tuning of the damping characteristics by means its weight, its location, its moment of inertia, etc.

Figure 11K:
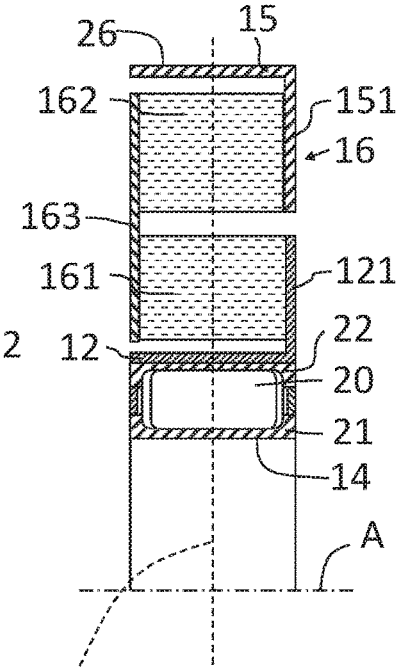

In the example embodiment of FIG. 11K the rubber-based spring element 16 comprises a first rubber-based member 161 rotationally fastened to the inner member 12 and a second rubber-based member 162 rotationally fastened to the outer member 15, and wherein the first and second rubber-based members 161, 162 are mutually connected by means of a an intermediate member 163, which is here made of an annular disc oriented in the radial plane. Here, the rubber-based spring element 16 is fastened to the inner and outer members 12, 15 using its axial surfaces, contrary to the design of FIG. 11J where the rubber-based spring element 16 is fastened to the inner and outer members 12, 15 using its radial surfaces.

As discussed above with reference to FIG. 11H, using the axial surface of the rubber-based spring element 16 for attachment to the inner and outer member 12, 15 results in entirely different damping characteristics of the torque equalizer and enables the decoupler to be better adapted to the specific circumstances. Moreover, the flanges 121, 151 of the inner and outer member 12, 15 provides a certain level of protection of the rubber-based spring element 16 against dirt and damages caused by contact with neighbouring components. Moreover, as discussed above with reference to FIG. 11J, having a first and second rubber-based members 161, 162 mutually connected by means of an intermediate member 163 enables more complex damping characteristics of the rubber-based spring element 16 and larger flexibility in terms of tuning for better adopting the rubber-based spring element 16 to the specific circumstances.

Figure 11L:
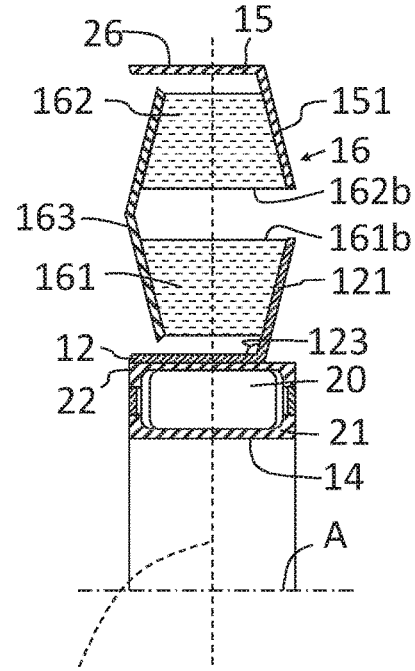

An example of a modified design of the torque equalizer of FIG. 11K is shown in FIG. 11L, where the flanges 121, 151 and the intermediate member 163 are inclined to provide annular first and second rubber-based members 161, 162 in form of isosceles trapezoids. In the illustrated example the first and second rubber-based members 161, 162 have their longest bases 161b, 162b facing each other, but this arrangement may be altered or even inversed. For example, both the first and second rubber-based members 161, 162 may have their longest bases 161b, 162b facing radially outwardly or radially inwardly, or facing away from each other. Having both the first and second rubber-based members 161, 162 with their longest bases 161b, 162b facing radially outwardly may in some circumstance be advantageous in terms of having an increasing axial thickness 164 of the first and second rubber-based members 161, 162 with increasing distance from the rotational axis A in the radial direction. Moreover, inclined flanges 121, 151 and intermediate member 163 may also be beneficial in terms of packaging because the decoupler then possibly requires less space.

Although not explicitly disclosed the decoupler assembly 1 shown in FIGS. 7-11L may of course be provided with a drive hub 2 and/or a pulley 4, and a torsional vibration damper TVD 60, as shown in FIGS. 5 and 6 respectively.

The expression "axial surface" used herein defines a surface of an object facing in an axial direction 300 and the expression "radial surface" used herein defines a surface of an object facing in a radial direction 200.

The relative rotational displacement between the inner and outer members 12, 15 is around the central rotational axis A of the decoupler 1.

It should be appreciated that while the decoupler 1 is mainly illustrated in association with the crank shaft of an engine, a decoupler constructed in accordance with the teachings of the present disclosure may be incorporated into various other devices in which a driven load is able at times to overspeed a source of rotary power, such as for example on the torque input shaft of engine accessories, such as alternator, supercharger, fluid pump, etc., or in the powertrain of a bicycle or motorbike. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. For example, in the example embodiments of FIGS. 11A-11L, the relative positioning of the one-way clutch bearing inwardly or outwardly of the torque equalizer may be shifted, the inclinations of the flanges may be varied, the size, form and shapes of the rubber-based spring element 16 or rubber-based members 161, 162 may be varied, the design of the attachment of the decoupler 1 to a shaft may be altered, the number of rubber-based members 161, 162 within a rubber-based spring element 16 may be varied, etc. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. A decoupler assembly comprising:
a torque equalizer; and
a one-way clutch bearing, the torque equalizer comprises an inner member having a rotational axis, an outer member disposed concentrically and surrounding the inner member, and two arcuate spring elements arranged between the inner member and the outer member, and configured to transmit torque between the inner member and the outer member, wherein the inner member is rotationally displaceable relative to the outer member at least 30 degrees upon compression of the two arcuate spring elements, wherein the one-way clutch bearing is located in a same radial plane as the torque equalizer and rotationally connected to the inner member or the outer member, and wherein the one-way clutch bearing comprises an outer race, an inner race, and a plurality of individual wedging locking elements that are disposed between the inner race and the outer race, and wherein the torque equalizer further comprises a spring sealing arrangement for sealingly enveloping the two arcuate spring elements, the spring sealing arrangement comprising a pair of annular sealing covers arranged on the opposite axial sides of the two arcuate spring elements, and wherein the pair of annular sealing covers support the inner race.

2. The decoupler assembly according to claim 1, wherein the inner member comprises an annular sleeve having an axial extension and an annular outwardly directed radial projection located in a central region along the axial extension, and wherein the radial projection forms a support surface for the two arcuate spring elements.

3. The decoupler assembly according to claim 1, wherein each of the two arcuate spring elements has a diameter in the range of 10-35 millimeters.

4. The decoupler assembly according to claim 1, wherein each of the two arcuate spring elements, in a natural state of the decoupler, extends over an angle of at least 60 degrees.

5. The decoupler assembly according to claim 1, wherein a circumferential length of each arcuate spring element in a natural state is larger than a corresponding circumferential length available between a driving surface of the inner member and a reaction surface of the outer member, such that each of the two arcuate springs elements constantly are in a compressed state.

6. The decoupler assembly according to claim 1, wherein each of the two arcuate spring elements has a variable spring constant over the compression range of the arcuate spring element.

7. The decoupler assembly according to claim 1, wherein the inner member, the outer member, and the two arcuate spring elements are arranged in the same radial plane.

* * * * *